(12) United States Patent
Huang

(10) Patent No.: US 11,503,223 B2
(45) Date of Patent: Nov. 15, 2022

(54) METHOD FOR IMAGE-PROCESSING AND ELECTRONIC DEVICE

(71) Applicant: GUANGDONG OPPO MOBILE TELECOMMUNICATIONS CORP., LTD., Guangdong (CN)

(72) Inventor: Jiewen Huang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 141 days.

(21) Appl. No.: 16/839,638

(22) Filed: Apr. 3, 2020

(65) Prior Publication Data
US 2020/0329188 A1    Oct. 15, 2020

(30) Foreign Application Priority Data
Apr. 9, 2019  (CN) .......................... 201910279898.3

(51) Int. Cl.
| | | |
|---|---|---|
| H04N 5/235 | (2006.01) | |
| G06T 5/00 | (2006.01) | |
| H04N 5/243 | (2006.01) | |
| H04N 5/265 | (2006.01) | |
| H04N 5/911 | (2006.01) | |

(52) U.S. Cl.
CPC .......... *H04N 5/2355* (2013.01); *G06T 5/002* (2013.01); *H04N 5/243* (2013.01); *H04N 5/265* (2013.01); *H04N 5/911* (2013.01); *G06T 2207/20208* (2013.01)

(58) Field of Classification Search
None
See application file for complete search history.

(56) References Cited

U.S. PATENT DOCUMENTS

| | | |
|---|---|---|
| 8,933,985 B1 | 1/2015 | Rapaport et al. |
| 2010/0111489 A1 | 5/2010 | Presler |
| 2015/0161797 A1 | 6/2015 | Park et al. |
| 2015/0195441 A1 | 7/2015 | Chen et al. |

(Continued)

FOREIGN PATENT DOCUMENTS

| | | |
|---|---|---|
| CN | 101764959 A | 6/2010 |
| CN | 102629995 A | 8/2012 |

(Continued)

OTHER PUBLICATIONS

International Search Report and Written Opinion for related International application No. PCT/CN2020/083909, dated May 27, 2020 (4 pages).

(Continued)

*Primary Examiner* — Quan Pham
(74) *Attorney, Agent, or Firm* — Young Basile Hanlon & MacFarlane, P.C.

(57) ABSTRACT

A method for image-processing and an electronic device are disclosed. The method includes: obtaining a RAW image packet comprising at least two RAW images, the at least two RAW images having different exposure durations; unpacking the RAW image packet and obtaining the at least two of RAW images; obtaining a High Dynamic Range (HDR) RAW image by performing an image synthesis operation on the at least two RAW images; and performing a previewing, photographing, or video-recording operation on the HDR RAW image.

19 Claims, 10 Drawing Sheets

(56) References Cited

U.S. PATENT DOCUMENTS

| | | | |
|---|---|---|---|
| 2015/0373248 A1 | 12/2015 | Wong | |
| 2016/0148356 A1* | 5/2016 | Dabral | G06T 1/20 382/166 |
| 2016/0227092 A1 | 8/2016 | Ikeda | |
| 2018/0097984 A1 | 4/2018 | Kobayashi et al. | |
| 2018/0255307 A1 | 9/2018 | Douady-Pleven et al. | |
| 2020/0265555 A1* | 8/2020 | Elgendy | G06T 3/4076 |

FOREIGN PATENT DOCUMENTS

| | | | |
|---|---|---|---|
| CN | 102694962 A | | 9/2012 |
| CN | 102833471 A | | 12/2012 |
| CN | 103260042 A | | 8/2013 |
| CN | 104917940 A | | 9/2015 |
| CN | 107566739 A | | 1/2018 |
| CN | 107896307 A | | 4/2018 |
| CN | 108259774 A | | 7/2018 |
| CN | 108280817 A | | 7/2018 |
| CN | 108419023 A | | 8/2018 |
| CN | 108989700 A | | 12/2018 |
| CN | 109413335 A | | 3/2019 |
| CN | 110012227 A | | 7/2019 |

OTHER PUBLICATIONS

English translation of the Chinese First Office Action and Written Opinion for related Chinese application No. 201910279898.3, dated Jun. 9, 2020 (15 pages).

European search report and Written Opinion for related European application No. 20169002.1, dated Jul. 10, 2020 (7 pages).

Chinese Notification to Grant Patent Right for Invention with English Translation for CN Application 201910279898.3 dated Jun. 3, 2021. (6 pages).

Chinese Second Office Action with English Translation for Chinese application No. 201910279898.3, dated Oct. 22, 2020 (12 pages).

Indian Examination Report for IN Application 202014015469 dated May 22, 2021. (5 pages).

Chinese Third Office Action with English Translation for CN Application 201910279898.3 dated Mar. 11, 2021. (18 pages).

Communication pursuant to Article 94(3) EPC for EP Application 20169002.1 dated Mar. 3, 2022. (5 pages).

* cited by examiner

Second image buffer queue

Third image buffer queue

METHOD FOR IMAGE-PROCESSING AND ELECTRONIC DEVICE

CROSS-REFERENCE TO RELATED APPLICATION(S)

This application claims priority to Chinese Patent Application No. 201910279898.3, filed on Apr. 9, 2019, the disclosure of which is herein incorporated by reference in its entirety.

TECHNICAL FIELD

The present disclosure generally relates to the technical field of images, and in particular to a method for image-processing and an electronic device.

BACKGROUND

Compared with an ordinary image, a high dynamic range (HDR) image can provide larger dynamic range and more image details. An electronic device can photograph multiple frames of images with different exposure degrees in a same scene, and synthesize dark details of an over-exposed image, middle details of a normal-exposed image and light details of an underexposed image, so as to obtain the HDR image. However, it is difficult for an image processed by the related HDR technologies to be suitable for previewing, photographing and video-recording at the same time.

SUMMARY

According to one aspect of the present disclosure, embodiments of the present disclosure provides a method for image-processing, including: obtaining a RAW image packet including at least two RAW images, the at least two RAW images having different exposure durations; unpacking the RAW image packet and obtaining the at least two of RAW images; obtaining a High Dynamic Range (HDR) RAW image by performing an image synthesis operation on the at least two RAW images; and performing a previewing, photographing, or video-recording operation on the HDR RAW image.

According to one aspect of the present disclosure, embodiments of the present disclosure provides an electronic device including a non-transitory memory storing executable codes, and a processor, wherein loading the executable codes, the processor is configured for: obtaining a RAW image packet including at least two RAW images, the at least two RAW images having different exposure durations; unpacking the RAW image packet and obtaining the at least two of RAW images; obtaining a High Dynamic Range (HDR) RAW image by performing an image synthesis operation on the at least two RAW images; and performing a previewing, photographing, or video-recording operation on the HDR RAW image.

According to one aspect of the present disclosure, embodiments of the present disclosure provides a non-transitory storage medium storing a plurality of instructions, when executed, causing a processor to perform a method for image-processing, wherein the method includes: obtaining a RAW image packet including at least two RAW images, the at least two RAW images having different exposure durations; unpacking the RAW image packet and obtaining the at least two of RAW images; obtaining a High Dynamic Range (HDR) RAW image by performing an image synthesis operation on the at least two RAW images; and performing a previewing, photographing, or video-recording operation on the HDR RAW image.

BRIEF DESCRIPTION OF DRAWINGS

Detailed embodiments of the present disclosure are described in detail with the accompanying drawings to make technical solutions and other advantageous effects of the present disclosure more obvious.

DETAILED DESCRIPTION

Figure 1:
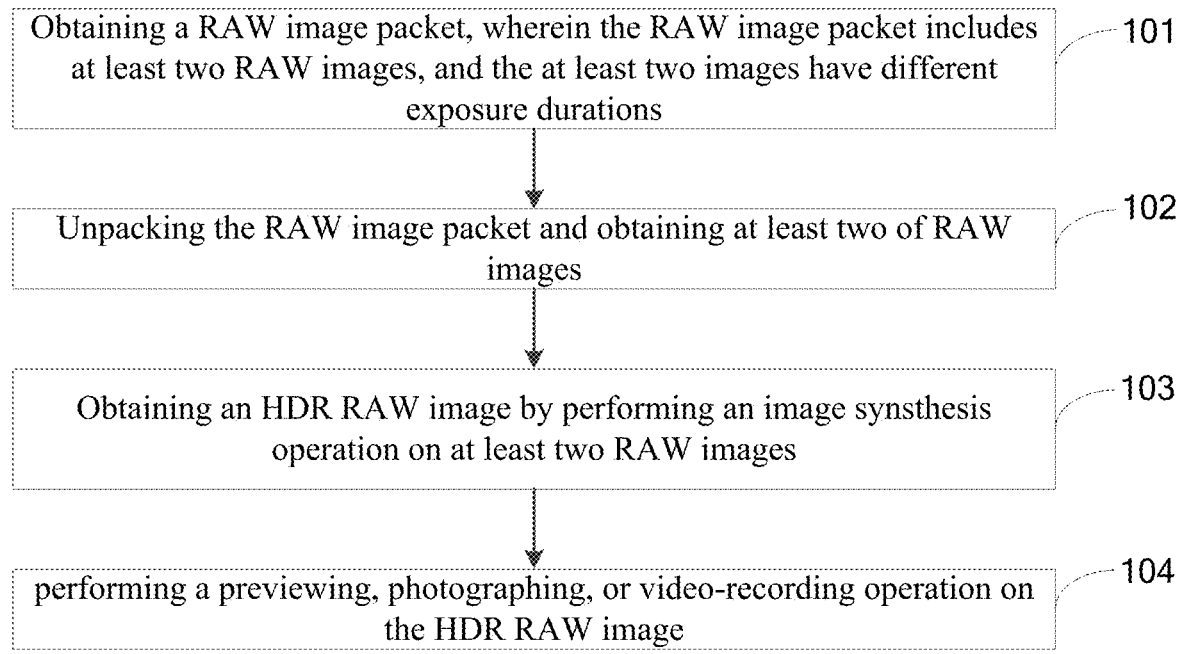
FIG. 1 is a first flow chart of a method for image-processing according to some embodiments.

Referring to the drawings, in which like reference numerals represent same components, the principles of the present disclosure are illustrated by the implementation in a suitable computing environment. The following description is based on specific embodiments of the present disclosure as illustrated, and should not be construed as limiting other specific embodiments that are not described herein.

A method for image-processing is provided, including: obtaining a RAW image packet including at least two RAW images, the at least two RAW images having different exposure durations; unpacking the RAW image packet and obtaining the at least two of RAW images; obtaining a High Dynamic Range RAW image by performing an image synthesis operation on the at least two RAW images; and performing a previewing, photographing, or video-recording operation on the HDR RAW image.

In some embodiments, the at least two RAW images include a first RAW image and a second RAW image that are sequentially exposed, and the first RAW image has an exposure duration longer than that of the second RAW image; the HDR RAW image is obtained from synthesizing the first RAW image and the second RAW image.

In some embodiments, the performing a previewing, photographing, or video-recording operation on the HDR RAW image includes: converting the synthesized RAW image into a YUV image; and preprocessing the YUV image and performing the previewing, photographing, or video-recording operation on the preprocessed YUV image.

In some embodiments, after the converting the HDR RAW image into a YUV image, the method further includes: storing the YUV image converted from the HDR RAW image into a preset first image buffer queue; wherein the method further includes: obtaining a plurality of YUV images from the first image buffer queue in response to receiving a photographing instruction; denoising the plurality of YUV images and obtaining a first denoised image; and responding to the photographing instruction according to the first denoised image.

In some embodiments, after the unpacking the RAW image packet and obtaining the first RAW image and the second RAW image, the method further includes: storing the second RAW image into a preset second image buffer queue; wherein the method further includes: obtaining a plurality of second RAW images from the second image buffer queue in response to receiving a photographing instruction, wherein the plurality of second RAW images are arranged in an order of times at which the plurality of second RAW images are stored into the second image buffer queue; obtaining a first synthesized image by performing an image synthesis operation on the plurality of second RAW images; and responding to the photographing instruction according to the first synthesized image.

In some embodiments, the obtaining a first synthesized image by performing an image synthesis operation on the plurality of second RAW images includes: denoising the plurality of second RAW images and obtaining a second denoised image; and boosting a brightness of the second denoised image and obtaining the first synthesized image.

In some embodiments, after the unpacking the RAW image packet and obtaining the first RAW image and the second RAW image, the method further includes storing the first RAW image and the second RAW image into a preset third image buffer queue; wherein the method further includes: obtaining a plurality of first RAW images and one second RAW image from the third image buffer queue in response to receiving a photographing instruction, wherein the plurality of first RAW images are arranged in an order of times at which the plurality of first RAW images are stored into the second image buffer queue, and the one second RAW image corresponds to one first RAW image and is arranged at the backmost of the third image buffer queue; denoising the plurality of first RAW images and obtaining a third denoised image; obtaining a second synthesized image by performing an image synthesis operation on the plurality of first RAW images and the one second RAW image; and responding to the photographing instruction according to the second synthesized image.

An electronic device is provided, including a non-transitory memory storing executable codes, and a processor, wherein loading the executable codes, the processor is configured for: obtaining a RAW image packet including at least two RAW images, the at least two RAW images having different exposure durations; unpacking the RAW image packet and obtaining the at least two of RAW images; obtaining a High Dynamic Range RAW image by performing an image synthesis operation on the at least two RAW images; and performing a previewing, photographing, or video-recording operation on the HDR RAW image.

In some embodiments, the at least two RAW images include a first RAW image and a second RAW image that are sequentially exposed, and the first RAW image has an exposure duration longer than that of the second RAW image; the HDR RAW image is obtained from synthesizing the first RAW image and the second RAW image.

In some embodiments, the performing a previewing, photographing, or video-recording operation on the HDR RAW image includes: converting the synthesized RAW image into a YUV image; and preprocessing the YUV image and performing the previewing, photographing, or video-recording operation on the preprocessed YUV image.

In some embodiments, the processor is further configured for: storing the YUV image converted from the synthesized RAW image into a preset first image buffer queue, after the converting the HDR RAW image into a YUV image. The processor is further configured for: obtaining a plurality of YUV images from the first image buffer queue in response to receiving a photographing instruction; denoising the plurality of YUV images and obtaining a first denoised image; and responding to the photographing instruction according to the first denoised image.

In some embodiments, the processor is further configured for: storing the second RAW image into a preset second image buffer queue, after the performing the unpacking the RAW image packet and obtaining the first RAW image and the second RAW image. The processor is further configured for: obtaining a plurality of second RAW images from the second image buffer queue in response to receiving a photographing instruction, wherein the plurality of second RAW images are arranged in an order of times at which the plurality of second RAW images are stored into the second image buffer queue; obtaining a first synthesized image by performing an image synthesis operation on the plurality of second RAW images; and responding to the photographing instruction according to the first synthesized image.

In some embodiments, the obtaining a first synthesized image by performing an image synthesis operation on the plurality of second RAW images includes: denoising the plurality of second RAW images and obtaining a second denoised image; and boosting a brightness of the second denoised image and obtaining the first synthesized image.

In some embodiments, the processor is further configured for: storing the first RAW image and the second RAW image into a preset third image buffer queue, after the unpacking the RAW image packet and obtaining the first RAW image and the second RAW image. The processor is further configured for: obtaining a plurality of first RAW images and one second RAW image from the third image buffer queue in response to receiving a photographing instruction, wherein the plurality of first RAW images are arranged in an order of times at which the plurality of first RAW images are stored into the second image buffer queue, and the one second RAW image corresponds to one first RAW image and is arranged at the backmost of the third image buffer queue; denoising the plurality of first RAW images and obtaining a third denoised image; obtaining a second synthesized image by performing an image synthesis operation on the plurality of first RAW images and the one second RAW image; and responding to the photographing instruction according to the second synthesized image.

A non-transitory storage medium is provided, storing a plurality of instructions, when executed, causing a processor to perform a method for process management, wherein the method includes: obtaining a RAW image packet including at least two RAW images, the at least two RAW images having different exposure durations; unpacking the RAW image packet and obtaining the at least two of RAW images; obtaining a High Dynamic Range RAW image by performing an image synthesis operation on the at least two RAW images; and performing a previewing, photographing, or video-recording operation on the HDR RAW image.

In some embodiments, the at least two RAW images include a first RAW image and a second RAW image that are sequentially exposed, and the first RAW image has an exposure duration longer than that of the second RAW image; the synthesized RAW image is obtained from synthesizing the first RAW image and the second RAW image.

In some embodiments, a preset first image buffer queue stores one or more YUV images each of which is converted from one HDR RAW image; wherein the method further includes: obtaining a plurality of YUV images from the first image buffer queue in response to receiving a photographing instruction; denoising the plurality of YUV images and obtaining a first denoised image; and responding to the photographing instruction according to the first denoised image.

In some embodiments, a preset second image buffer queue includes one or more second RAW images each of which is unpacked from one RAW image packet; wherein the method further includes: obtaining a plurality of second RAW images from the second image buffer queue in response to receiving a photographing instruction, wherein the plurality of second RAW images are arranged in an order of times at which the plurality of second RAW images are stored into the second image buffer queue; obtaining a first synthesized image by performing an image synthesis operation on the plurality of second RAW images; and responding to the photographing instruction according to the first synthesized image.

In some embodiments, the obtaining a first synthesized image by performing an image synthesis operation on the plurality of second RAW images includes: denoising the plurality of second RAW images and obtaining a second denoised image; and boosting a brightness of the second denoised image and obtaining the first synthesized image.

In some embodiments, a preset third image buffer queue includes one or more first RAW images each of which is unpacked from one RAW image packet and one or more second RAW images each of which is unpacked from one RAW image packet; wherein the method further includes: obtaining a plurality of first RAW images and one second RAW image from the third image buffer queue in response to receiving a photographing instruction, wherein the plurality of first RAW images are arranged in an order of times at which the plurality of first RAW images are stored into the second image buffer queue, and the one second RAW image corresponds to one first RAW image and is arranged at the backmost of the third image buffer queue; denoising the plurality of first RAW images and obtaining a third denoised image; obtaining a second synthesized image by performing an image synthesis operation on the plurality of first RAW images and the one second RAW image; and responding to the photographing instruction according to the second synthesized image.

It can be understood that, an execution body for embodiments of the present disclosure may be an electronic device such as a smartphone or tablet.

FIG. 1 is a first flow chart of a method for image-processing according to some embodiments. The method includes actions/operations in the following.

At 101, the method obtains a RAW image packet, wherein the RAW image packet includes at least two RAW images, and the at least two images have different exposure durations.

Compared with an ordinary image, a High Dynamic Range (HDR) image can provide a larger dynamic range and more image details. An electronic device can photograph multiple frames of images with different exposure degrees in a same scene, and synthesize dark details of an over-exposed image, middle details of a normal-exposed image and light details of an underexposed image, so as to obtain the HDR image. However, it is difficult for an image processed by the related HDR technologies to be suitable for previewing, photographing and video-recording at the same time.

For example, when using the zzHDR technology for image processing, as a same frame of image has pixels performed long exposure and pixels performed short exposure, and the pixels performed long exposure and the pixels performed short exposure are synthesized to generate an HDR image, the resolution can at least be reduced by a half. Therefore, the HDR image resulted from the zzHDR technology cannot be used for photographing or video-recording, and otherwise users will obviously view display effect of the image in reduced resolution. That is, the zzHDR technology cannot be applied to scenes of photographing and video-recording. For other HDR technologies in related art, there are problems such as low resolution or low signal-to-noise ratio, such that images processed by these HDR technologies are not suitable for previewing, photographing and video-recording at the same time.

The method for image processing according to some embodiments can be applied to an electronic device having a camera module. The camera module of the electronic device includes a lens and an image sensor, wherein the lens is used for collecting signals of external light sources to the image sensor, and the image sensor senses the signals of the light sources from the lens, and converts the signals into digital original image data, i.e., RAW image data. RAW is a format of un-processing and uncompressing, which can be visually referred to as a "digital negative". The image sensor of the camera module of the electronic device in this embodiment may have a first operation mode and a second operation mode.

Figure 2:
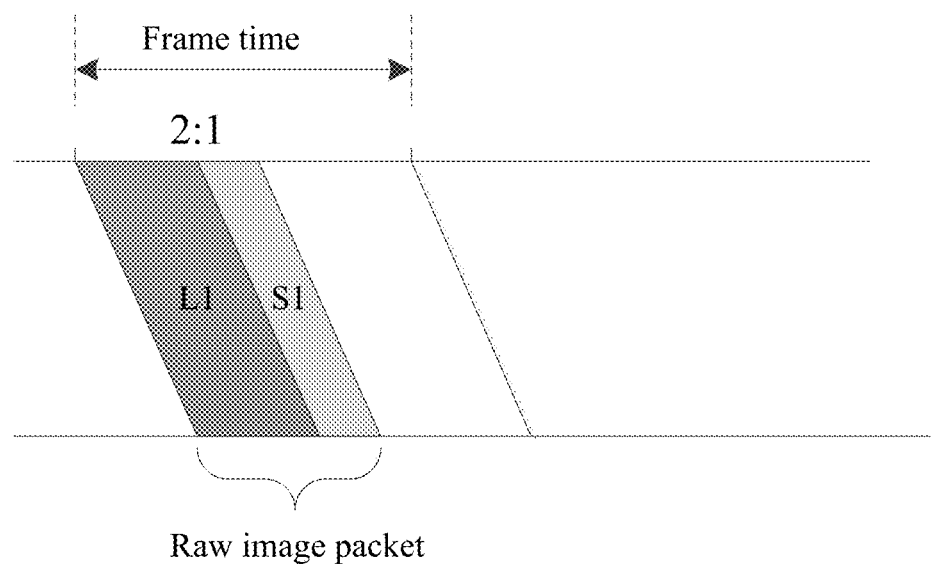
FIG. 2 is a first diagram of a RAW image packet according to some embodiments.

It should be noted that, in the first operation mode, the image sensor generates at least two RAW images having different exposure durations during one frame of image, processes the at least two RAW images into a RAW image packet, and then output the RAW image packet. For example, if the frame rate of the image sensor is 30 fps, the image sensor will generate at least two RAW images having different exposure durations in 1/30 second and output in a form of a RAW image packet. For example, as shown in FIG. 2, the RAW image packet output by the image sensor in the first operation mode includes two RAW images, and the exposure duration of one RAW image is twice the exposure duration of the other RAW image. That is, the image sensor operating in the first operation mode can output a RAW image packet within a frame time (such as 1/30 second), the RAW image packet includes two RAW images, and the exposure duration of one of the two RAW images is twice that of the other. Of course, the ratio of the exposure durations of these two RAW images can also be another value, such as 3:1 or 4:1 or 3:2, etc., which is not specifically limited in this embodiment. It can be understood that since there is a very short interval between photographing times of the two RAW images in the RAW image packet, it can be considered that the two RAW images are photographed in the same scene.

The above-mentioned second operation mode is a normal operation mode. In the second operation mode, the image sensor generates a separate RAW image, rather than a RAW image packet, during one frame of image. For example, in the normal operation mode, if the frame rate of the image sensor is 60 fps, the image sensor generates and outputs one RAW image in 1/60 second.

In this embodiment of the present disclosure, the electronic device may firstly acquire a RAW image packet through an image sensor operating in the first operation mode. Light signals from the current scene converges on the image sensor after passing through the lens of the camera, and the image sensor performs an alternate exposure with different exposure durations, and continuously output the RAW image packet including at least two sets of RAW images. It is understandable that at least two RAW images included in the RAW image packet have different exposure durations.

For example, when a camera application is turned on by users' operation on the electronic device, the image sensor is enabled in the electronic device and operates in the first operation mode. If the camera of the electronic device is aimed at a certain scene by the users' operation, the electronic device will continuously acquire the RAW image packet under the scene through the image sensor operating in the first operation mode, and the RAW image packet includes at least two RAW images having different exposure durations.

At 102, the method unpacks the RAW image packet and obtains at least two of RAW images.

For example, after acquiring a RAW image packet, the electronic device can unpack the RAW image packet to obtain at least two RAW images.

At 103, the method obtains a High Dynamic Range (HDR) RAW image by performing an image synthesis operation on at least two RAW images. That is, the HDR RAW image has a high dynamic range.

For example, after the RAW image packet is unpacked, the electronic device can perform an HDR synthesizing-processing for at least two RAW images that are obtained by depacketizing, so as to obtain the HDR RAW image.

At 104, the method performs a previewing, photographing, or video-recording operation on the HDR RAW image.

For example, after obtaining the HDR RAW image, the electronic device can use the HDR RAW image to perform previewing, photographing or video-recording operation on the HDR RAW image. For example, the electronic device can display the HDR RAW image in a preview interface of a camera application of the electronic device for the user to preview. When the electronic device receives a photographing instruction, for example, when the photographing button is pressed by a user, the electronic device can directly take the synthesized RAW composite image as an output to display on a display screen for the user to view. When the electronic device receives a video-recording instruction, the electronic device may take the synthesized RAW image as one of frames of a video resulted from the video-recording.

It should be noted that, in this embodiment, since at least two RAW images included in the RAW image packet are fully-exposed images, a resolution of an image, which is obtained from the at least two RAW images being performed HDR-synthesizing processing, does not be reduced, and a signal-to-noise ratio thereof is also high. That is, the HDR RAW image having a high dynamic range obtained in this embodiment has advantages of high resolution and high signal-to-noise ratio. Thus, the HDR RAW image with a high dynamic range that has a high resolution and a high signal-to-noise ratio can be directly used for previewing, photographing and video-recording.

Figure 3:
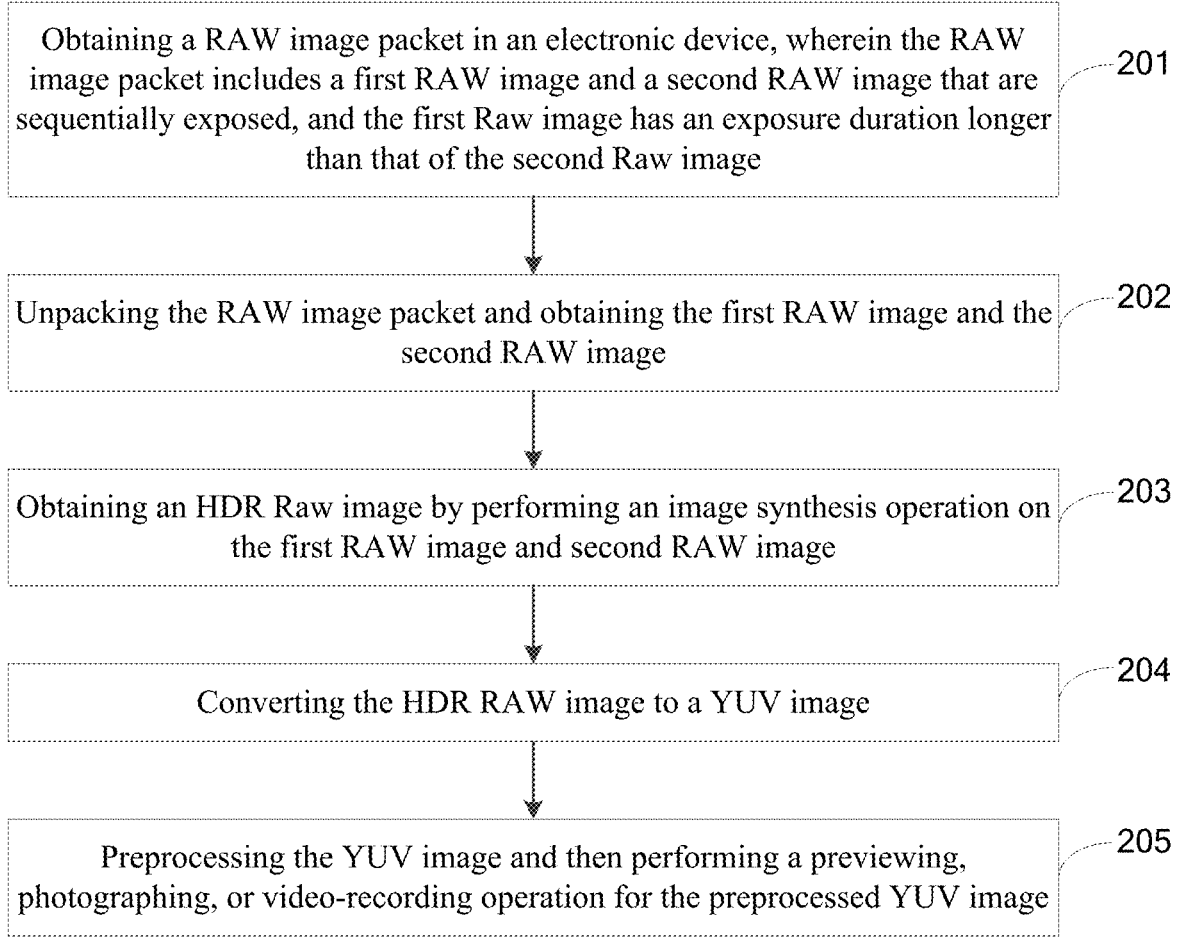
FIG. 3 is a second flow chart of a method for image-processing according to some embodiments.

FIG. 3 is a second flow chart of a method for image-processing according to some embodiments. The method includes actions/operations in the following.

At 201, the method obtains a RAW image packet in an electronic device, wherein the RAW image packet includes a first RAW image and a second RAW image that are sequentially exposed, and the first RAW image has an exposure duration longer than that of the second RAW image.

For example, when a camera application is turned on by users' operation, an image sensor of the electronic device is enabled, and the image sensor is set to operate in a first operation mode. The image sensor generates two RAW images with different exposure durations during one frame of image, and then output in a form of a RAW image packet. For example, if the frame rate of the image sensor is 30 fps, the image sensor will generate two RAW images with different exposure durations within 1/30 second and output in a form of the RAW image packet. For example, in a first 1/30 second, an image frame L having a first exposure duration T1 and an image frame S having a second exposure duration T2 are sequentially generated. The first exposure duration T1 is longer than the second exposure duration T2. The image sensor performs long exposure to obtain the image frame L1, and then puts the image frame L1 into a buffer of the image sensor instead of outputting the image frame L1 right now, clears accumulated charges on the image sensor immediately, and performs short exposure to obtain the image frame S1. After the image frame S is readout, the electronic device packs the image frames L1 and S1 into a RAW image packet. In a second 1/30 second, an image frame L2 having a first exposure duration T1 and an image frame S2 having a second exposure duration T2 are sequentially generated. In a third 1/30 second, an image frame L3 having a first exposure duration T1 and an image frame S3 having a second exposure duration T2 are sequentially generated. In other words, the electronic device performs long exposure and short exposure alternately to output a RAW image packet.

After an image sensor of the electronic device operates in a first operation mode, for example, a camera of the electronic device is aimed at a certain scene by the users' operation, the electronic device obtains a RAW image packet of the scene through the image sensor. The RAW image packet includes a first RAW image and a second RAW image which are sequentially exposed, and the first RAW image has an exposure duration longer than that of the second RAW image. In this embodiment, an image with a long exposure duration in the RAW image packet is collectively referred as the first RAW image, and an image with a short exposure duration in the RAW image packet is collectively referred as the second RAW image. For example, the exposure duration of the first RAW image is twice the exposure duration of the second RAW image. It can be understood that since there is a very short interval between times at which the first RAW image and the second RAW image in the RAW image packet are photographed, it can be considered that the first RAW image and the second RAW image in the RAW image packet are photographed in the same scene.

At 202, the method unpacks the RAW image packet and obtains the first RAW image and the second RAW image.

For example, after acquiring the RAW image packet, the electronic device can unpack the RAW image packet to obtain the first RAW image and second RAW image.

At 203, the method synthesizes the first RAW image and second RAW image and obtains an HDR RAW image. That is, the HDR RAW image has a high dynamic range.

For example, after the first RAW image and second RAW image is obtained by the depacketizing, the electronic device can perform HDR synthesizing-processing for the first RAW image and second RAW image, so as to obtain a RAW image having a high dynamic range. i.e. the HDR RAW image.

At 204, the method converts the HDR RAW image to a YUV image.

For example, after obtaining the HDR RAW image, the electronic device converts the HDR RAW image to an image in YUV, so as to obtain the YUV image.

It should be noted that YUV is a color-coding method, in which Y represents brightness, U represents chroma, and V represents concentration. Human eyes can intuitively feel natural features contained in YUV images. In some embodiments of the present disclosure, the electronic device can perform format conversion for the HDR RAW image, converting the HDR RAW image into YUV color space to obtain the YUV image suitable for human eyes to view.

At 205, the method preprocesses the YUV image and then performs a previewing, photographing, or video-recording operation on the preprocessed YUV image.

For example, after the HDR RAW image is converted to the YUV image, the electronic device preprocesses the YUV image. After the preprocessing, the electronic device performs a previewing, photographing, or video-recording operation on the preprocessed YUV image.

For example, when currently being in a preview interface of a camera application in the electronic device, the electronic device can directly display the preprocessed YUV image in the preview interface for the user to preview.

For another example, after the YUV image is preprocessed, a photographing button of the camera application in the electronic device is pressed by a user such that a photographing operation is performed, the electronic device can directly take the YUV image as an image to display on a display screen for the user to view photographing effect.

For yet another example, the electronic device is in a video-recording mode currently, and the electronic device takes the preprocessed YUV image as one of frames of a video resulted from the video-recording.

In some embodiments, the preprocessing may be an image optimization processing such as image-sharpening processing, image-noise-reduction processing, etc.

It should be noted that, as the HDR RAW image has an effect of high dynamic range, the YUV image, which is converted from the HDR RAW image, also has the effect of high dynamic range. Thus, an image for which a previewing, photographing, or video-recording operation is performed after the YUV image is preprocessed for a user to view also has the effect of high dynamic range.

In this embodiment, since the first RAW images and the second RAW image are fully-exposed images, a resolution of an image, which is obtained from first RAW images and the second RAW image being performed HDR-synthesizing processing, does not be reduced, and a signal-to-noise ratio thereof is also high. That is, the HDR RAW image with a high dynamic range obtained in this embodiment has advantages of high resolution and high signal-to-noise ratio. The HDR RAW image with a high dynamic range that has a high resolution and a high signal-to-noise ratio is converted to the YUV image, and the preprocessed YUV image can be directly used for previewing, photographing and video-recording. That is, an image obtained by the method for image-processing according to this embodiment can be suitable for previewing, photographing and video-recording.

Figure 4:
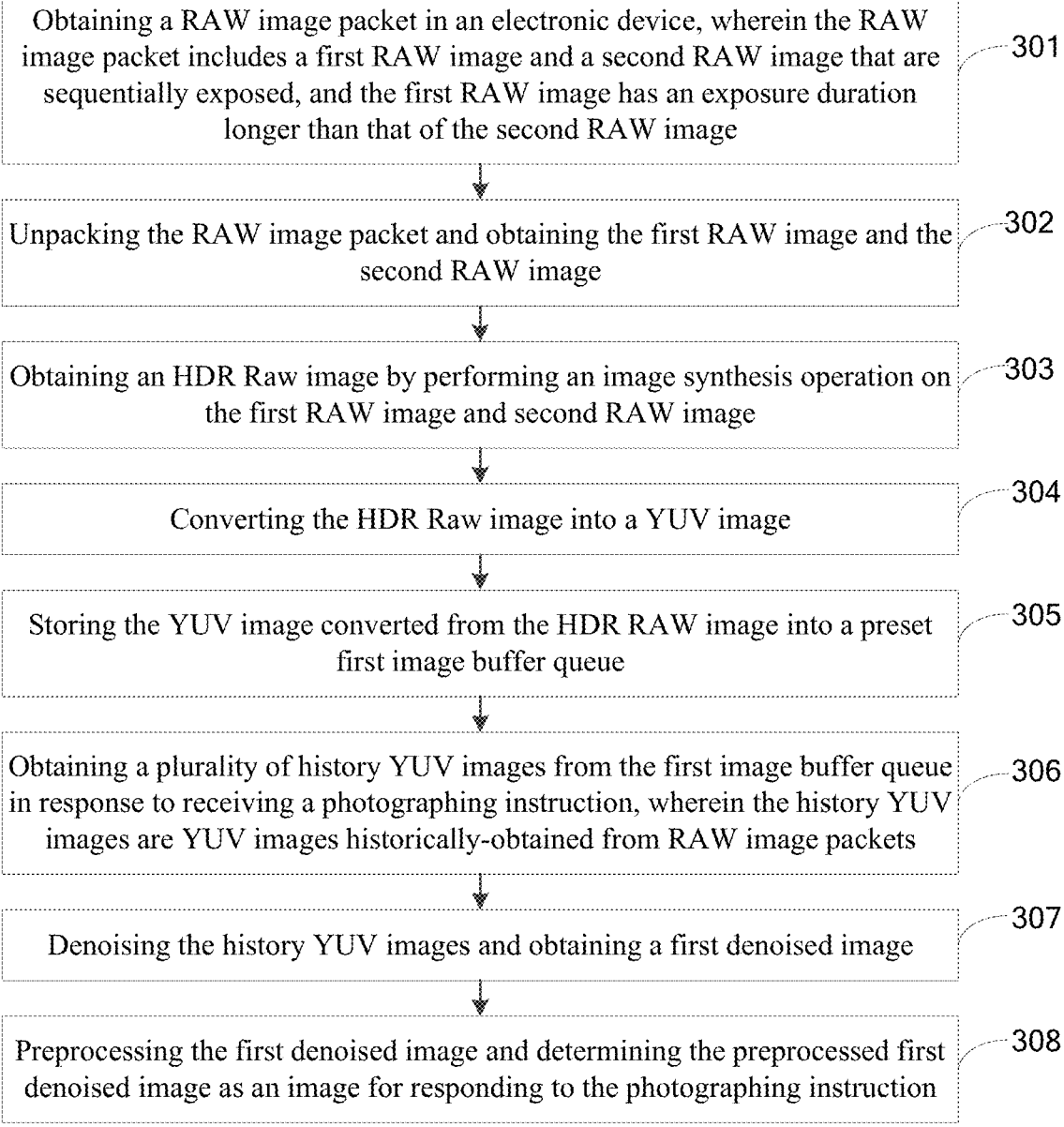
FIG. 4 is a third flow chart of a method for image-processing according to some embodiments.

FIG. 4 is a third flow chart of a method for image-processing according to some embodiments. The method includes actions/operations in the following.

At 301, the method obtains a RAW image packet in an electronic device, wherein the RAW image packet includes a first RAW image and a second RAW image that are sequentially exposed, and the first RAW image has an exposure duration longer than that of the second RAW image.

At 302, the method unpacks the RAW image packet and obtains the first RAW image and the second RAW image.

At 303, the method obtains an HDR RAW image with a high dynamic range by performing an image synthesis on the first RAW image and second RAW image. That is, the HDR RAW image has an HDR.

At 304, the method converts the HDR RAW image into a YUV image.

For example, actions/operations at 301, 302, 303, and 304 includes the following.

When a camera application is turned on by users' operation, an image sensor of the electronic device is enabled, and the image sensor is set to operate in a first operation mode.

After the image sensor of the electronic device operates in a first operation mode, for example, a camera of the electronic device is aimed at a certain scene by the users' operation, the electronic device obtains a RAW image packet of the scene through the image sensor. The RAW image packet includes a first RAW image and a second RAW image which are sequentially exposed, and the first RAW image has an exposure duration longer than that of the second RAW image. For example, the exposure duration of the first RAW image is twice the exposure duration of the second RAW image. It can be understood that since there is a very short interval between times at which the first RAW image and the second RAW image in the RAW image packet are photographed, it can be considered that the first RAW image and the second RAW image in the RAW image packet are photographed in the same scene.

After acquiring the RAW image packet, the electronic device can unpack the RAW image packet to obtain the first RAW image and second RAW image. Then, the electronic device can perform HDR synthesizing-processing for the first RAW image and second RAW image, so as to obtain a RAW image having a high dynamic range. i.e. the HDR RAW image.

Then, the electronic device converts the HDR RAW image to a YUV image.

In other words, each time the electronic device obtains a RAW image packet, the electronic device unpacks the RAW image packet into the first RAW image and the second RAW image, then synthesizes the first RAW image and the second RAW image so as to obtain the HDR RAW image with a high dynamic range, and the converts the HDR RAW image to the YUV image. That is, the electronic device can continuously acquire YUV images.

The YUV image obtained in the electronic device can be displayed in a preview interface of a camera application.

For example, after obtaining a first RAW image packet, the electronic device unpacks the first RAW image packet to obtain a first RAW image and a second RAW image, synthesizes the first RAW image and the second RAW image to obtain an HDR RAW image with a high dynamic range, and converts the HDR RAW image to a YUV image 'A'.

When obtaining a second RAW image packet, the electronic device unpacks the second RAW image packet to obtain a first RAW image and a second RAW image, synthesizes the first RAW image and the second RAW image to obtain an HDR RAW image with a high dynamic range, and converts the HDR RAW image to a YUV image 'B'.

When obtaining a third RAW image packet, the electronic device unpacks the third RAW image packet to obtain a first RAW image and a second RAW image, synthesizes the first RAW image and the second RAW image to obtain an HDR RAW image with a high dynamic range, and converts the HDR RAW image to a YUV image 'C'.

Thus, the YUV image 'A', YUV image 'B', and YUV image 'C' are successively displayed in the preview interface of the camera application of the electronic device.

At 305, the method stores the YUV image converted from the HDR RAW image into a preset first image buffer queue.

For example, after the HDR RAW image is converted to a corresponding YUV image, the electronic device may store the converted YUV image into the preset first image buffer queue. The first image buffer queue may be a fixed-length queue or an unfixed-length queue, which is not specifically limited in this embodiment.

At 306, the method obtains a plurality of history YUV images from the first image buffer queue in response to receiving a photographing instruction, wherein the history YUV images are YUV images historically-obtained from RAW image packets.

At 307, the method denoises the history YUV images and obtains a first denoised image.

At 308, the method preprocesses the first denoised image and determines the preprocessed first denoised image as an image for responding to the photographing instruction.

For example, actions/operations at 306, 307, and 308 may include the following.

For example, the photographing button of the camera application is pressed, and then the electronic device receives the photographing instruction. In this case, the electronic device can obtain multiple frames of history YUV images. The history YUV images are YUV images historically-obtained from RAW image packets. For example, the electronic device may obtain multiple frames of history YUV images that are obtained recently from the first image buffer queue.

When obtaining the history YUV images, the electronic device performs a denoising processing for the history YUV images so as to obtain the first denoised image. The electronic device then preprocesses the first denoised image and determines the preprocessed first denoised image as an image for responding to the photographing instruction.

For example, the electronic device obtains four history YUV images 'A'-'D' from the first image buffer queue. The electronic device then performs a denoising processing for the YUV images 'A'-'D' to obtain a first denoised image.

It should be noted that when performing a denoising processing for the YUV images 'A'-'D', the electronic device can determine a basic frame from the YUV images 'A'-'D', for example, the YUV image 'A' is determined as the basic frame, and then the electronic device can align the YUV images 'A'-'D'. The electronic device can then calculate an average pixel value of each pixel point based on the aligned images. For example, if the pixel values of a pixel point in the YUV images 'A'-'D' are 101, 102, 103, 102 successively, then the electronic device determines the pixel value of the pixel point as 102, and changes the pixel value of the pixel point in the YUV image 'A' that is the basic frame from 101 to 102. Similarly, a pixel value of each pixel point in the YUV image 'A' that is the basic frame is changed to a corresponding average pixel value. A denoised image is then obtained, which is the first denoised image.

When obtaining the first denoised image, the electronic device performs a preprocessing for the first denoised image, for example, image-sharpening processing, and determines the first denoised image after the preprocessing as an image for responding to a photographing instruction. For example, the electronic device determines the denoised image after the preprocessing as a photo and displays the photo in an interface of a camera application for users to view the photographing effect.

It can be appreciated that in this embodiment, the electronic device may perform a denoising processing for the YUV images obtained historically and then obtains an HDR photo having better definition.

For example, when a camera application is turned on by users' operation, an image sensor of the electronic device is enabled, and the image sensor is set to operate in a first operation mode. After the image sensor of the electronic device operates in a first operation mode, for example, a camera of the electronic device is aimed at a certain scene by the users' operation, the electronic device obtains a RAW image packet of the scene through the image sensor. The RAW image packet includes a first RAW image and a second RAW image which are sequentially exposed, and the first RAW image has an exposure duration longer than that of the second RAW image. For example, the exposure duration of the first RAW image is twice the exposure duration of the second RAW image.

Figure 5:
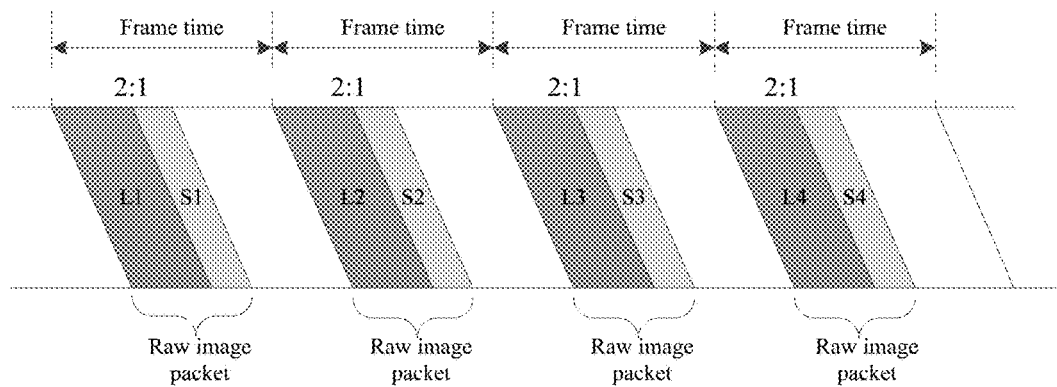
FIG. 5 is a second diagram of a RAW image packet according to some embodiments.
Figure 6:
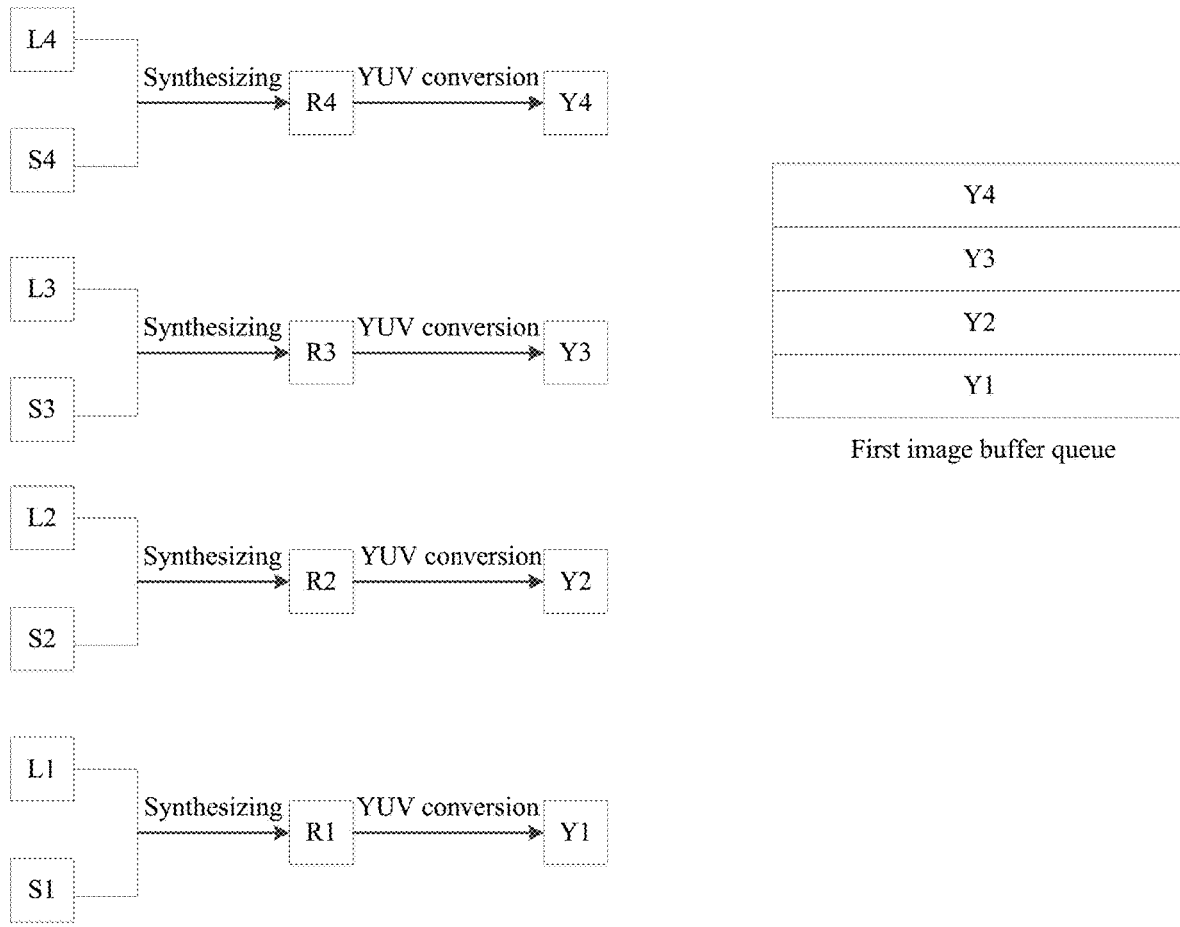
FIG. 6 is a diagram of a YUV image and a first image buffer queue according to some embodiments.

For example, as shown in FIGS. 5 and 6, the electronic device obtains a first RAW image packet through the image sensor and unpacks the first RAW image packet to obtain the first RAW image (long exposure image) L1 and the second RAW image (short exposure image) S1. The electronic device then synthesizes the image L1 and the image S1 so as to obtain an HDR RAW image R1 with HDR, and converts the image R1 to the image Y1 in YUV format. When obtaining the image Y1, the electronic device displays the image Y1 in the preview interface of the camera application for users to preview. Further, the electronic device stores the image Y1 into the first image buffer queue.

Then, the electronic device obtains a second RAW image packet through the image sensor and unpacks the second RAW image packet to obtain the first RAW image (long exposure image) L2 and the second RAW image (short exposure image) S2 The electronic device then synthesizes the image L2 and the image S2 so as to obtain an HDR RAW image R2 with HDR, and converts the image R2 to the image Y2 in YUV format. When obtaining the image Y2, the electronic device displays the image Y2 in the preview interface of the camera application for users to preview. Further, the electronic device stores the image Y2 into the first image buffer queue.

Then, the electronic device obtains a third RAW image packet through the image sensor, and unpacks the third RAW image packet to obtain the first RAW image (long exposure image) L3 and the second RAW image (short exposure image) S3 similarly. The electronic device then synthesizes the image L3 and the image S3 so as to obtain an HDR RAW image R3 with HDR, and converts the image R3 to the image Y3 in YUV format. When obtaining the image Y3, the electronic device displays the image Y3 in the preview interface of the camera application for users to preview. Further, the electronic device stores the image Y3 into the first image buffer queue.

Then, the electronic device obtains a fourth RAW image packet through the image sensor, and unpacks the fourth RAW image packet to obtain the first RAW image (long exposure image) L4 and the second RAW image (short exposure image) S4 similarly. The electronic device then synthesizes the image L4 and the image S4 so as to obtain an HDR RAW image R4 with HDR, and converts the image R4 to the image Y4 in YUV format. When obtaining the image Y4, the electronic device displays the image Y4 in the preview interface of the camera application for users to preview. Further, the electronic device stores the image Y4 into the first image buffer queue.

When the photographing button in the interface of the camera application is pressed by users, the electronic device obtains four YUV images that are obtained recently, for example, the images Y4-Y1. The electronic device then performs a denoising processing for the images Y4-Y1 so as to obtain a denoised image, and performs a preprocessing for the denoised image, for example, image-sharpnessing. The electronic device displays the preprocessed denoised image in the interface of the camera application as a photo resulted from photographing for users to view.

Figure 7:
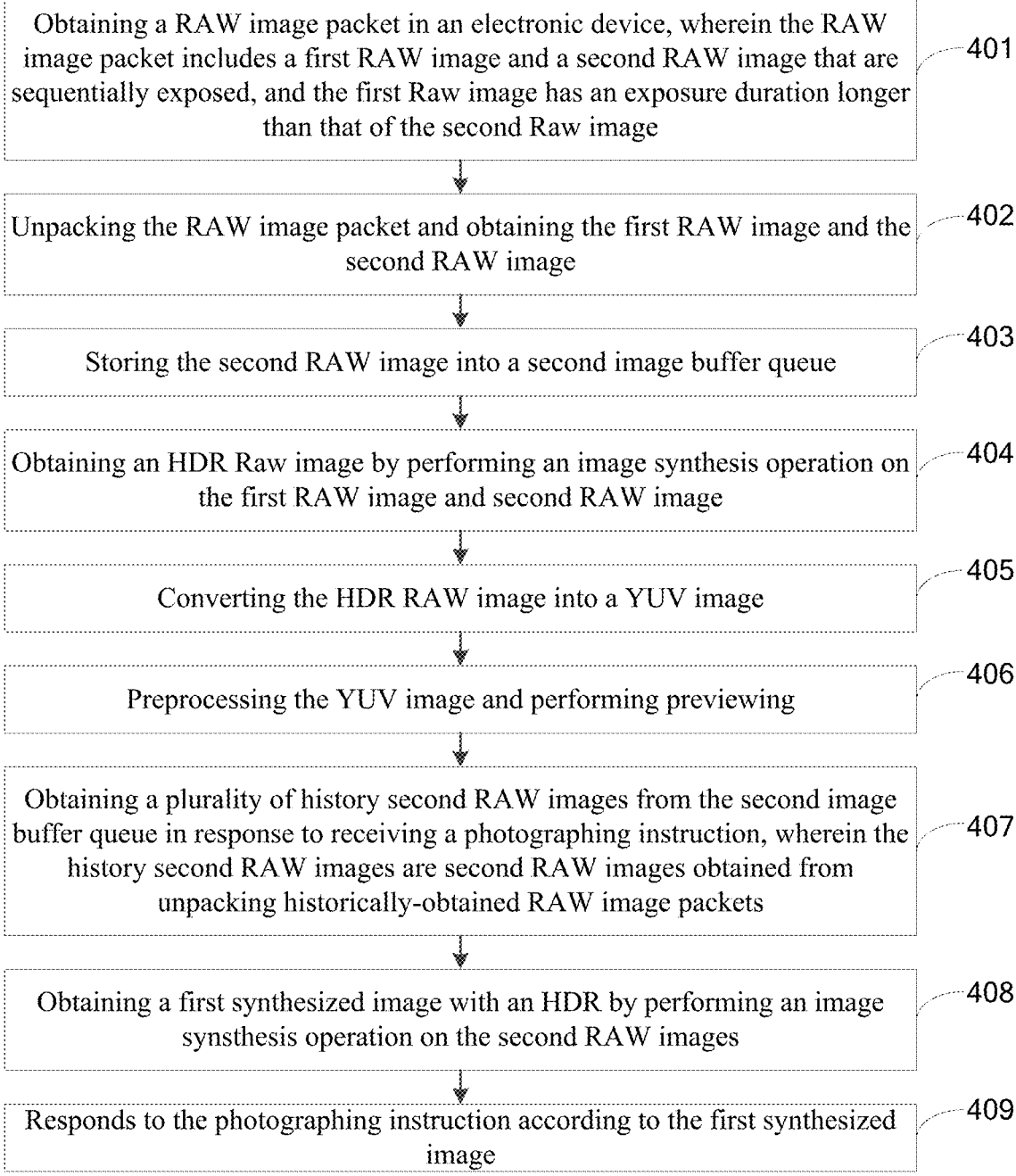
FIG. 7 is a fourth flow chart of a method for image-processing according to some embodiments.

FIG. 7 is a fourth flow chart of a method for image-processing according to some embodiments. The method includes actions/operations in the following.

At 401, the method obtains a RAW image packet in an electronic device, wherein the RAW image packet includes a first RAW image and a second RAW image that are sequentially exposed, and the first RAW image has an exposure duration longer than that of the second RAW image.

At 402, the method unpacks the RAW image packet and obtains the first RAW image and the second RAW image.

At 303, the method stores the second RAW image into a second image buffer queue.

At 404, the method obtains an HDR RAW image by performing a image synthesis on the first RAW image and second RAW image. That is, the HDR RAW image has an HDR.

At 405, the method converts the HDR RAW image into a YUV image.

For example, actions/operations at 401, 402, 403, 404, and 405 includes the following.

When a camera application is turned on by users' operation, an image sensor of the electronic device is enabled, and the image sensor is set to operate in a first operation mode.

After the image sensor of the electronic device operates in a first operation mode, for example, a camera of the electronic device is aimed at a certain scene by the users' operation, the electronic device obtains a RAW image packet of the scene through the image sensor. The RAW image packet includes a first RAW image and a second RAW image which are sequentially exposed, and the first RAW image has an exposure duration longer than that of the second RAW image. For example, the exposure duration of the first RAW image is twice the exposure duration of the second RAW image. It can be understood that since there is a very short interval between times at which the first RAW image and the second RAW image in the RAW image packet are photographed, it can be considered that the first RAW image and the second RAW image in the RAW image packet are photographed in the same scene.

After acquiring the RAW image packet, the electronic device can unpack the RAW image packet to obtain the first RAW image and second RAW image. Further, the electronic device stores the second RAW image into the second image buffer queue. In this embodiment, the second image buffer queue may be a fixed-length queue or an unfixed-length queue.

Then, the electronic device can perform HDR synthesizing-processing for the first RAW image and second RAW image, so as to obtain a RAW image with a high dynamic range image. i.e. the HDR RAW image.

Then, the electronic device converts the HDR RAW image to a YUV image.

In other words, each time the electronic device obtains a RAW image packet, the electronic device unpacks the RAW image packet into the first RAW image and the second RAW image, then synthesizes the first RAW image and the second RAW image so as to obtain the HDR RAW image with a high dynamic range, and then converts the HDR RAW image to the YUV image. Therefore, the electronic device can continuously acquire YUV images.

The YUV image obtained in the electronic device can be displayed in a preview interface of the camera application.

For example, after obtaining a first RAW image packet, the electronic device unpacks the first RAW image packet to obtain a first RAW image and a second RAW image, synthesizes the first RAW image and the second RAW image to obtain an HDR RAW image with a high dynamic range, and converts the HDR RAW image to a YUV image 'A'.

When obtaining a second RAW image packet, the electronic device unpacks the second RAW image packet to obtain a first RAW image and a second RAW image, synthesizes the first RAW image and the second RAW image to obtain an HDR RAW image with a high dynamic range, and converts the HDR RAW image to a YUV image 'B'.

When obtaining a third RAW image packet, the electronic device unpacks the third RAW image packet to obtain a first RAW image and a second RAW image, synthesizes the first RAW image and the second RAW image to obtain an HDR RAW image with a high dynamic range, and converts the HDR RAW image to a YUV image 'C'.

Thus, the YUV image 'A', YUV image 'B', and YUV image 'C' are successively displayed in the preview interface of the camera application of the electronic device.

At 406, the method preprocesses the YUV image and performs previewing.

For example, when converting the HDR RAW image to a YUV image, the electronic device performs a preprocessing for the YUV image, such as image-sharpnessing, denoising. The electronic device displays the YUV that has been preprocessed in the preview interface of the camera application for users to preview.

At 407, the method obtains a plurality of history second RAW images from the second image buffer queue in response to receiving a photographing instruction, wherein the history second RAW images are second RAW images obtained from unpacking historically-obtained RAW image packets.

For example, the photographing button of the camera application is pressed when a YUV image is previewed by users, that is, the electronic device receives a photographing instruction. At this time, the electronic device can obtain multiple frames of history RAW images from the second image buffer queue. It can be understood that the history second RAW images are second RAW images (short exposure images) obtained as the electronic device unpacks the historically-obtained RAW image packets.

For example, the second image buffer queue includes 8 second RAW images arranged in an order of storing times, which are S1, S2, S3, S4, S5, S6, S7, and S8. The electronic device obtains 4 second RAW images that are stored recently from the second image buffer queue in response to receiving a photographing instruction, for example, S5, S6, S7, and S8.

At 408, the method obtains a first synthesized image with an HDR by performing an image synthesis operation on the second RAW images.

At 409, the method responds to the photographing instruction according to the first synthesized image.

For example, after obtaining the four second RAW images S5, S6, S7, and S8, the electronic device synthesizes the four second RAW images so as to obtain the first synthesized image with an HDR, and responds to the photographing instruction according to the first synthesized image. For example, the electronic device outputs and displays the first synthesized image in the interface of the camera application as a photo resulted from photographing for users to view.

It can be understood that in this embodiment, the electronic device converts an HDR RAW image, which is obtained from depacketizing a RAW image packet to obtain the first RAW image and the second RAW image and synthesizing the first RAW image and the second RAW image, to a corresponding YUV image, and performs previewing for the YUV image. When receiving a photographing instruction, the electronic device obtains multiple history second RAW images, and synthesizes the history second RAW images so as to obtain a first synthesized image with an HDR, and then takes the first synthesized image to respond to the photographing instruction. That is, the method according to this embodiment performs HDR synthesizing processing for multiple short exposure images in response to the photographing instruction.

It should be noted that since the multiple history second RAW images are short exposure images, these second RAW images have a same brightness level. During image-synthesizing, whether performing motion detection of an object in an image, or performing optimization of image-repairing for motion artifact resulted from object motion when object motion is detected, the second RAW images having the same brightness level are adopted to make it easy to perform motion detection and perform image-repairing for motion artifact. Therefore, the method according to this embodiment can optimize a problem of motion artifact in a photographed image.

In some embodiments, synthesizing the multiple second RAW images to obtain a first denoised image with an HDR at 404 includes actions/operations in the following.

The electronic device performing denoising processing for the history second RAW image and obtaining a second denoised image.

The electronic device boosting a brightness of the second denoised image and obtaining the first synthesized image with an HDR.

For example, the second RAW images obtained by the electronic device are S5, S6, S7, and S8. The electronic device firstly performs a denoising processing for the S5, S6, S7, and S8, in which S8 is selected as a basic frame in the electronic device and S8 is denoised with the S5, S6, and S7, and then obtains the denoised S8 (i.e. second denoised image). The electronic device boosts a brightness of the denoised S8 to boost dark details in the S8. Thus, the first synthesized image with an HDR is obtained.

In some embodiments, synthesizing a first synthesized image with HDR according to the multiple second RAW images and responding to a photographing instruction according to the first synthesized image in this embodiment may be applied for a photographing scene having a small dynamic range. The photographing scene having a small dynamic range may be a scene such as a normal indoor or outdoor photographing scene without serious backlight.

For example, when a camera application is turned on by users' operation, an image sensor of the electronic device is enabled, and the image sensor is set to operate in a first operation mode. After the image sensor of the electronic device operates in a first operation mode, for example, a camera of the electronic device is aimed at a certain scene by the users' operation, the electronic device obtains a RAW image packet of the scene through the image sensor. The RAW image packet includes a first RAW image and a second RAW image which are sequentially exposed, and the exposure duration of the first RAW image is twice the exposure duration of the second RAW image.

Figure 8:
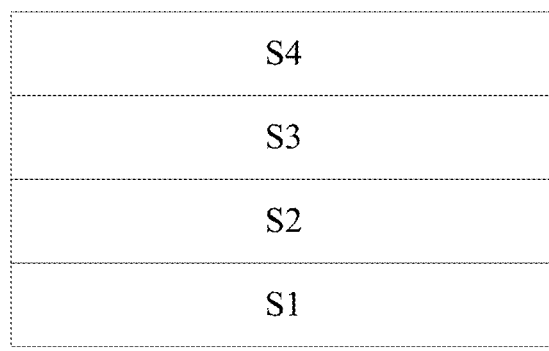
FIG. 8 is a diagram of a second image buffer queue according to some embodiments.

For example, as shown in FIGS. 5 and 8, the electronic device obtains a first RAW image packet through the image sensor and unpacks a first RAW image packet to obtain the first RAW image (long exposure image) L1 and a second RAW image (short exposure image) S1. Further, the electronic device stores the image S1 into the preset second image buffer queue. The electronic device then synthesizes the image L1 and the image S1 so as to obtain an HDR RAW image R1 with HDR, and converts the image R1 to an image Y1 in YUV format. When obtaining the image Y1, the electronic device displays the image Y1 in the preview interface of the camera application for users to preview.

Then, the electronic device obtains a second RAW image packet through the image sensor and unpacks the second RAW image packet to obtain a first RAW image (long exposure image) L2 and a second RAW image (short exposure image) S2. Further, the electronic device stores the image S2 into the second image buffer queue. The electronic device then synthesizes the image L2 and the image S2 so as to obtain an HDR RAW image R2 with HDR, and converts the image R2 to the image Y2 in YUV format. When obtaining the image Y2, the electronic device displays the image Y2 in the preview interface of the camera application for users to preview.

Then, the electronic device obtains a third RAW image packet through the image sensor, and unpacks the third RAW image packet to obtain a first RAW image (long exposure image) L3 and a second RAW image (short exposure image) S3 similarly. Further, the electronic device stores the image S3 into the second image buffer queue. The electronic device then synthesizes the image L3 and the image S3 so as to obtain an HDR RAW image R3 with HDR, and converts the image R3 to the image Y3 in YUV format. When obtaining the image Y3, the electronic device displays the image Y3 in the preview interface of the camera application for users to preview.

Then, the electronic device obtains a fourth RAW image packet through the image sensor, and unpacks the fourth RAW image packet to obtain a first RAW image (long exposure image) L4 and a second RAW image (short exposure image) S4 similarly. Further, the electronic device stores the image S4 into the second image buffer queue. The electronic device then synthesizes the image L4 and the image S4 so as to obtain an HDR RAW image R4 with HDR, and converts the image R4 to the image Y4 in YUV format. When obtaining the image Y4, the electronic device displays the image Y4 in the preview interface of the camera application for users to preview.

When the photographing button in the interface of the camera application is pressed by users, the electronic device obtains four second RAW images that are obtained recently, for example the images S4-S1 obtained by the electronic device. The electronic device then synthesized the images S4-S1 so as to obtain a first synthesized image. The electronic device performs a preprocessing for the denoised image, for example, image-sharpnessing. The electronic device displays the preprocessed first synthesized image in the interface of the camera application as a photo resulted from photographing for users to view.

Figure 9:
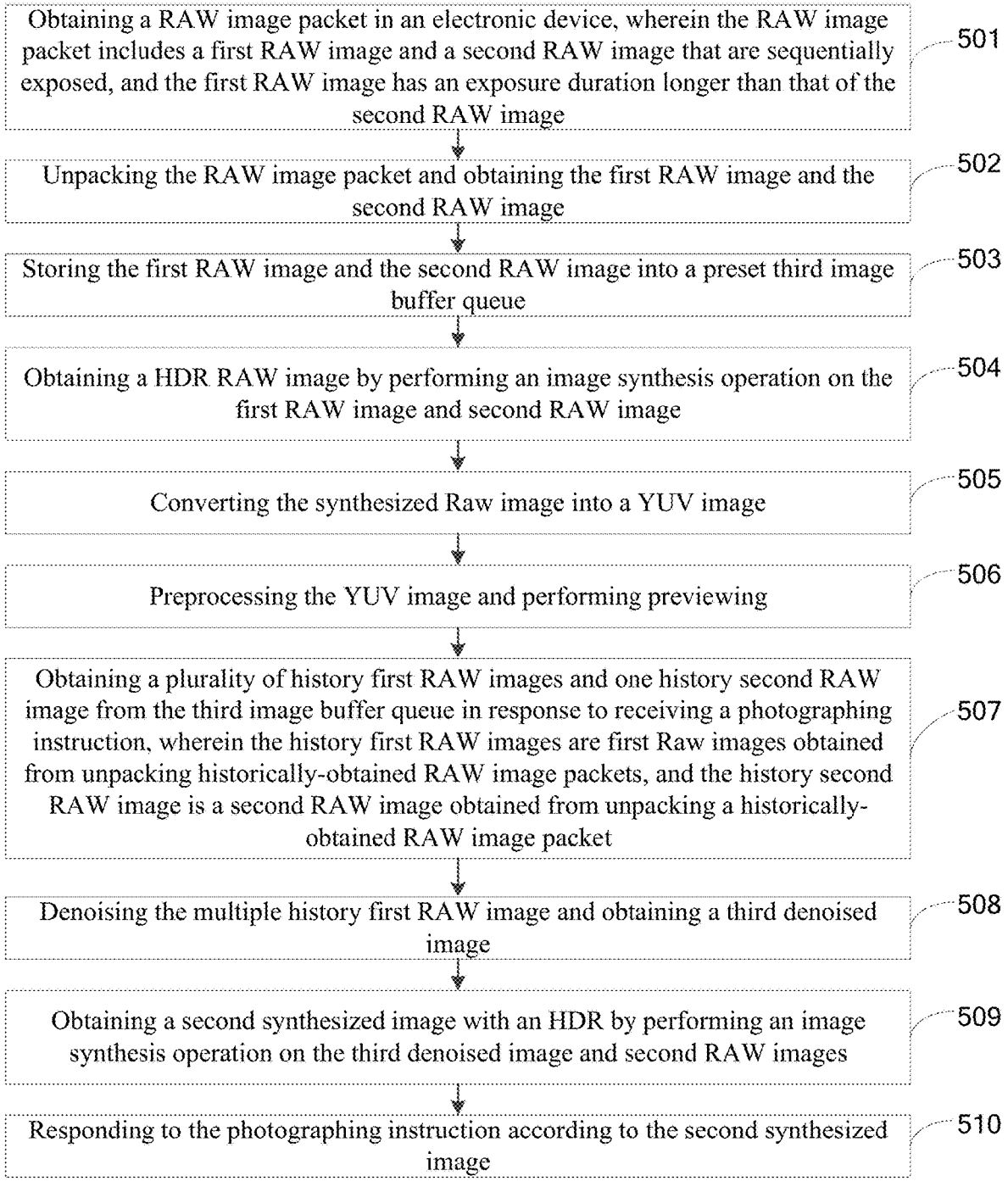
FIG. 9 is a fifth flow chart of a method for image-processing according to some embodiments.

FIG. 9 is a fifth flow chart of a method for image-processing according to some embodiments. The method includes actions/operations in the following.

At 501, the method obtains a RAW image packet in an electronic device, wherein the RAW image packet includes a first RAW image and a second RAW image that are sequentially exposed, and the first RAW image has an exposure duration longer than that of the second RAW image.

At 502, the method unpacks the RAW image packet and obtains the first RAW image and the second RAW image.

At 503, the method stores the first RAW image and the second RAW image into a preset third image buffer queue.

At 504, the method obtains an HDR RAW image by performing an image synthesis operation on the first RAW image and second RAW image. That is, the HDR RAW image has an HDR.

At 505, the method converts the HDR RAW image into a YUV image.

For example, actions/operations at 501, 502, 503, 504, and 505 includes the following.

When a camera application is turned on by users' operation, an image sensor of the electronic device is enabled, and the image sensor is set to operate in a first operation mode.

After the image sensor of the electronic device operates in a first operation mode, for example, a camera of the electronic device is aimed at a certain scene by the users' operation, the electronic device obtains a RAW image packet of the scene through the image sensor. The RAW image packet includes a first RAW image and a second RAW image which are sequentially exposed, and the first RAW image has an exposure duration longer than that of the second RAW image. For example, the exposure duration of the first RAW image is twice the exposure duration of the second RAW image. It can be understood that since there is a very short interval between times at which the first RAW image and the second RAW image in the RAW image packet are photographed, it can be considered that the first RAW image and the second RAW image in the RAW image packet are photographed in the same scene.

After acquiring the RAW image packet, the electronic device can unpack the RAW image packet to obtain the first RAW image and the second RAW image. Further, the electronic device stores the unpacked first RAW image and second RAW image into the third image buffer queue. In this embodiment, the third image buffer queue may be a fixed-length queue or an unfixed-length queue.

Then, the electronic device can perform HDR synthesizing-processing for the unpacked first RAW image and second RAW image, so as to obtain a RAW image with an HDR. i.e. the HDR RAW image.

Then, the electronic device converts the HDR RAW image to a YUV image.

In other words, each time the electronic device obtains a RAW image packet, the electronic device unpacks the RAW image packet into a first RAW image and a second RAW image, then synthesizes the first RAW image and the second RAW image so as to obtain the HDR RAW image with a high dynamic range, and then converts the HDR RAW image to the YUV image. Therefore, the electronic device can continuously acquire YUV images.

The YUV image obtained in the electronic device can be displayed in a preview interface of a camera application.

For example, after obtaining a first RAW image packet, the electronic device unpacks the first RAW image packet to obtain a first RAW image and a second RAW image, synthesizes the first RAW image and the second RAW image to obtain an HDR RAW image, and converts the HDR RAW image to a YUV image 'A'.

When obtaining a second RAW image packet, the electronic device unpacks the second RAW image packet to obtain a first RAW image and a second RAW image similarly, synthesizes the first RAW image and the second RAW image to obtain an HDR RAW image with a high dynamic range, and converts the HDR RAW image to a YUV image 'B'.

When obtaining a third RAW image packet, the electronic device unpacks the third RAW image packet to obtain a first RAW image and a second RAW image, synthesizes the first RAW image and the second RAW image to obtain an HDR RAW image with a high dynamic range, and converts the HDR RAW image to a YUV image 'C'.

Thus, the YUV image 'A', YUV image 'B', and YUV image 'C' are successively displayed in the preview interface of the camera application of the electronic device.

At 506, the method preprocesses the YUV image and performs previewing.

For example, when converting the HDR RAW image to a YUV image, the electronic device performs a preprocessing for the YUV image, such as image sharpnessing and denoising. The electronic device displays the YUV that has been preprocessed in the preview interface of the camera application for users to preview.

At 507, the method obtains a plurality of history first RAW images and one history second RAW image from the third image buffer queue in response to receiving a photographing instruction, wherein the history first RAW images are first RAW images obtained from unpacking historically-obtained RAW image packets, and the history second RAW image is a second RAW image obtained from unpacking a historically-obtained RAW image packet.

For example, the photographing button of the camera application is pressed when a YUV image is previewed by users, that is, the electronic device receives a photographing instruction. At this time, the electronic device can obtain multiple frames of history first RAW images and one history second RAW image from the third image buffer queue. It can be understood that the history first RAW images are first RAW images (long exposure images) obtained as the electronic device unpacks the historically-obtained RAW image packets, and the history second RAW image is a second RAW image (short exposure images) obtained as the electronic device unpacks the historically-obtained RAW image packet.

For example, the third image buffer queue includes 8 first RAW images arranged in an order of storing times, which is L1, L2, L3, L4, L5, L6, L7, and L8. The electronic device obtains 4 first RAW images that are stored recently from the third image buffer queue in response to receiving a photographing instruction, for example, L5, L6, L7, and L8. The third image buffer queue includes 8 second RAW images arranged in an order of storing times, which is S1, S2, S3, S4, S5, S6, S7, and S8. The electronic device obtains one second RAW image that is stored recently from the third image buffer queue in response to receiving the photographing instruction, for example, S8.

At 508, the method denoises the multiple history first RAW image and obtains a third denoised image.

At 509, the method obtains a second synthesized image with an HDR by performing an image synthesis operation on the third denoised image and the second RAW images.

At 510, the method responds to the photographing instruction according to the second synthesized image.

For example, after obtaining the four history first RAW images L5, L6, L7, and L8, the electronic device performs a denoising processing for the 4 first RAW images so as to obtain the third denoised image. For example, as the electronic device selects the second RAW image S8, the electronic device determines the first RAW image L8 corresponding to the second RAW image S8 as a basic frame for denoising. With other history first RAW image L5, L6, and L7, the basic frame (i.e. L8) is performed a denoising so as to obtain the denoised image L8 (i.e. a third denoised image).

After obtaining the third denoised image, the electronic device synthesizes the third denoised image and the history second RAW image so as to obtain the second synthesized image with an HDR. For example, the electronic device synthesizes the denoised image L8 and the second RAW image S so as to obtain the second synthesized image with an HDR.

After obtaining the second synthesized image with an HDR, the electronic device responds to the photographing instruction according to the second synthesized image. For example, the electronic device outputs and displays the second synthesized image in an interface of a camera application as a photo resulted from photographing for users to view.

It can be understood that in this embodiment, the electronic device converts the HDR RAW image, which is obtained from depacketizing a recently-obtained RAW image packet to obtain the first RAW image and the second RAW image and synthesizing the first RAW image and the second RAW image, to a corresponding YUV image, and performs previewing for the YUV image. At the same time, the electronic device stores the unpacked first RAW image and second RAW image. When receiving a photographing instruction, the electronic device obtains multiple history first RAW images and one history second RAW image, performs a denoising processing for the multiple first RAW images so as to obtain a third denoised image firstly, then synthesizes the third denoised image and the history second RAW image so as to obtain a second synthesized image with an HDR, and then takes the second synthesized image to respond to the photographing instruction. That is, the method according to this embodiment performs a denoising processing for long exposure images firstly and then performs HDR-synthesizing processing for an image resulted from the denoising processing and one short exposure duration image in response to the photographing instruction.

It should be noted that in the method for image-processing according to the above embodiment, when responding to the photographing instruction, the long exposure images L5, L6, L7 and L8 are firstly performed denoising processing. For example, in a scene for photographing in the daytime, since the long exposure images have relatively low noise, the second synthesized image has low noise for responding to the photographing instruction finally. After the long exposure images are performed a denoising processing so as to obtain a denoised image, the denoised image and a short exposure image are performed HDR-synthesizing processing. Therefore, the second synthesized image for responding to the photographing instruction finally also has a wide dynamic range. Since there is a small interval between times at which the long exposure image L8 and the short exposure image S8, motion artifact of the second synthesized image for responding to the photographing instruction finally has been optimized obviously. Therefore, the image processing scheme in this embodiment can achieve a good balance among noise, high dynamic range, and motion artifact optimization.

The method for image-processing in the fifth flow chart can be applied to a scene with a large dynamic range. The scene with a large dynamic range may be photographing in backlight, such as backlight-photographing a person in front of a window in a sunny day For example, when a camera application is turned on by users' operation, an image sensor of the electronic device is enabled, and the image sensor is set to operate in a first operation mode. After the image sensor of the electronic device operates in a first operation mode, for example, a camera of the electronic device is aimed at a certain scene by the users' operation, the electronic device obtains a RAW image packet of the scene through the image sensor. The RAW image packet includes a first RAW image and a second RAW image which are sequentially exposed, and the exposure duration of the first RAW image is twice the exposure duration of the second RAW image.

Figure 10:
FIG. 10 is a diagram of a third image buffer queue according to some embodiments.

For example, as shown in FIGS. 5 and 10, the electronic device obtains a first RAW image packet through the image sensor and unpacks the first RAW image packet to obtain a first RAW image (long exposure image) L1 and a second RAW image (short exposure image) S1. Further, the electronic device stores the images L1 and S1 into a preset third image buffer queue. The electronic device then synthesizes the image L1 and the image S1 so as to obtain an HDR RAW image R1 with HDR, and converts the image R1 to an image Y1 in YUV format. When obtaining the image Y1, the electronic device displays the image Y1 in the preview interface of the camera application for users to preview.

Then, the electronic device obtains a second RAW image packet through the image sensor and unpacks the second RAW image packet to obtain a first RAW image (long exposure image) L2 and a second RAW image (short exposure image) S2. Further, the electronic device stores the images L2 and S2 into the third image buffer queue. The electronic device then synthesizes the image L2 and the image S2 so as to obtain an HDR RAW image R2 with HDR, and converts the image R2 to the image Y2 in YUV format. When obtaining the image Y2, the electronic device displays the image Y2 in the preview interface of the camera application for users to preview.

Then, the electronic device obtains a third RAW image packet through the image sensor, and unpacks the third RAW image packet to obtain a first RAW image (long exposure image) L3 and a second RAW image (short exposure image) S3 similarly. Further, the electronic device stores the images L3 and S3 into the third image buffer queue. The electronic device then synthesizes the image L3 and the image S3 so as to obtain an HDR RAW image R3 with HDR, and converts the image R3 to the image Y3 in YUV format. When obtaining the image Y3, the electronic device displays the image Y3 in the preview interface of the camera application for users to preview.

Then, the electronic device obtains a fourth RAW image packet through the image sensor, and unpacks the fourth RAW image packet to obtain the first RAW image (long exposure image) L4 and the second RAW image (short exposure image) S4 similarly. Further, the electronic device stores the images L4 and S4 into the third image buffer queue. The electronic device then synthesizes the image L4 and the image S4 so as to obtain an HDR RAW image R4 with HDR, and converts the image R4 to the image Y4 in YUV format. When obtaining the image Y4, the electronic device displays the image Y4 in the preview interface of the camera application for users to preview.

When the photographing button in the interface of the camera application is pressed by users, the electronic device obtains four history first RAW images and one history second RAW image that are obtained recently, for example the first RAW images S4-S1 obtained by the electronic device recently and the second RAW image S4. The electronic device then performs a denoising processing for the images L4, L3, L2, and L1 so as to obtain a third denoised image, for example, the denoised image L4. The electronic device synthesizes the denoised image L4 and image S4 so as to obtain a second synthesized image with an HDR. The electronic device performs a preprocessing for the second synthesized image such as image-sharpnessing. The electronic device displays the preprocessed second synthesized image in the interface of the camera application as a photo resulted from photographing for users to view.

Figure 11:
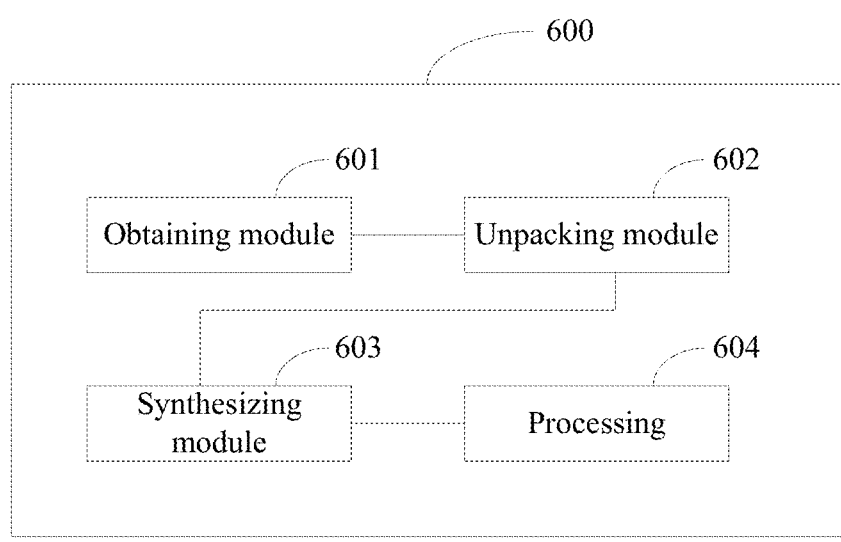
FIG. 11 is a structural diagram of an apparatus for image-processing according to some embodiments.

FIG. 11 is a structural diagram of an apparatus for image-processing according to some embodiments. The apparatus 300 for image-processing includes an obtaining module 601, a unpacking module 602, a synthesizing module 603, and a processing module 604.

The obtaining module 601 is configured for obtaining a RAW image packet, wherein the RAW image packet includes at least two RAW images, and the at least two RAW images have different exposure durations.

The unpacking module 602 is configured for unpacking the RAW image packet and obtaining the at least two of RAW images.

The synthesizing module 603 is configured for synthesizing the at least two RAW images and obtaining an HDR RAW image. That is, the HDR RAW image has an HDR.

The processing module 604 is configured for performing a previewing, photographing, or video-recording operation on the HDR RAW image.

In some embodiments, the obtaining module 601 is configured for obtaining the RAW image packet, wherein the RAW image packet includes a first RAW image and a second RAW image that are sequentially exposed, and the first RAW image has an exposure duration longer than that of the second RAW image;

the unpacking module 602 is configured for unpacking the RAW image packet and obtaining the first RAW image and the second RAW image;

the synthesizing module 603 is configured for synthesizing the first RAW image and the second RAW image and obtaining the HDR RAW image.

In some embodiments, the processing module 604 is configured for:

converting the HDR RAW image into a YUV image, and preprocessing the YUV image and performing the previewing, photographing, or video-recording operation on the preprocessed YUV image.

In some embodiments, the processing module 604 is further configured for:

storing the YUV image converted from the HDR RAW image into a preset first image buffer queue;

obtaining a plurality of YUV images from the first image buffer queue in response to receiving a photographing instruction;

denoising the plurality of YUV images and obtaining a first denoised image; and responding to the photographing instruction according to the first denoised image.

In some embodiments, the processing module 604 is further configured for:

storing the second RAW image into a preset second image buffer queue;

obtaining a plurality of second RAW images from the second image buffer queue in response to receiving a photographing instruction, wherein the plurality of second RAW images are arranged in an order of times at which the plurality of second RAW images are stored into the second image buffer queue;

obtaining a first synthesized image by performing an image synthesis operation on the plurality of second RAW images; and responding to the photographing instruction according to the first synthesized image.

In some embodiments, the processing module 604 is configured for:

denoising the plurality of second RAW images and obtaining a second denoised image; and boosting a brightness of the second denoised image and obtaining the first synthesized image.

In some embodiments, the processing module 604 is further configured for:

storing the first RAW image and the second RAW image into a preset third image buffer queue;

obtaining a plurality of first RAW images and one second RAW image from the third image buffer queue in response to receiving a photographing instruction, wherein the plurality of first RAW images are arranged in an order of times at which the plurality of first RAW images are stored into the second image buffer queue, and the one second RAW image corresponds to one first RAW image and is arranged at the backmost of the third image buffer queue;

denoising the plurality of first RAW images and obtaining a third denoised image;

obtaining a second synthesized image by performing an image synthesis operation on the plurality of first RAW images and the one second RAW image; and responding to the photographing instruction according to the second synthesized image.

Embodiments of the present disclosure provides a storage medium storing computer programs, when executed in a computer, causing the computer performing a method according to embodiments of the present disclosure.

Embodiments of the present disclosure provides an electronic device comprising a memory and a processor, wherein the processor calls computer programs stored in the memory to perform a method for image-processing according to embodiments of the present disclosure.

Figure 12:
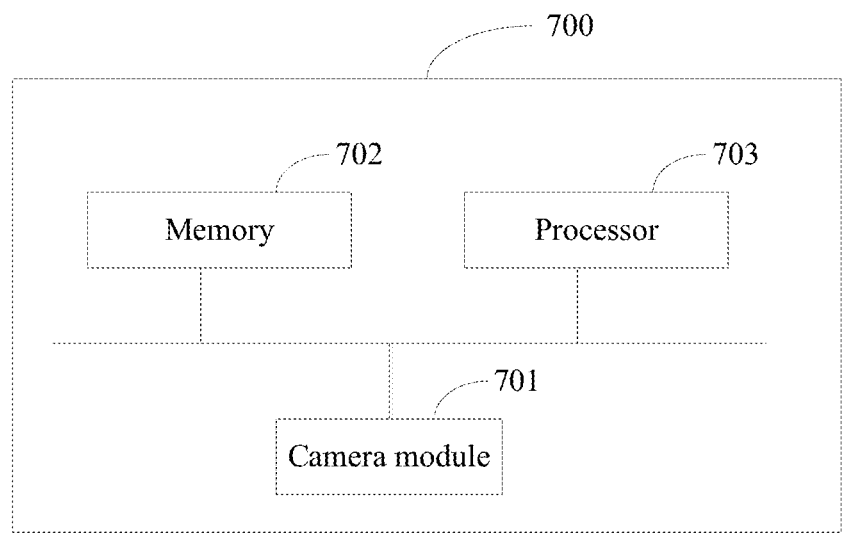
FIG. 12 is a structural diagram of an electronic device according to some embodiments.

For example, the electronic device may be a mobile terminal such as a tablet computer or a smart phone. FIG. 12 is a structural diagram of an electronic device according to some embodiments of the present disclosure.

The electronic device 700 may include a camera module 701, a memory 702, a processor 703 and the like. It may be understood by those skilled in the art that a structure of the electronic device shown in FIG. 12 does not constitute a limitation to the electronic device, and may include more or fewer components than what is shown, or combinations of some components, or different component arrangements.

The camera module 701 may include a lens and an image sensor, wherein the lens is used for collecting signals of external light sources to the image sensor, and the image sensor senses the signals of the light source from the lens, and converts the signals into digital original image data, i.e., RAW image data. RAW is a format of un-processing and uncompressing, which can be visually referred to as a "digital negative". The image sensor of the camera module of the electronic device may have a first operation mode and a second operation mode. The image sensor generates at least two RAW images with different exposure durations during one frame of image, processes the at least two RAW images into a RAW image packet, and then output the RAW image packet. In the second operation mode, the image sensor generates a separate RAW image, rather than a RAW image packet, during one frame of image.

The memory 702 can be used to store application programs and data. The application programs stored in the memory 702 contains executable codes. The application programs may be formed as various functional modules. The processor 703 implements various function applications and data processing by executing the application programs stored in the memory 702.

The processor 703 is a control center of the electronic device, and is configured to be connected all parts of the electronic device via various interfaces and lines. Various functions and data processing of the electronic device may be implemented by running or executing the application programs stored in the memory 702 and calling data stored in the memory 702. Thus, the electronic device may be monitored wholly.

In this embodiment, the processor 703 in the electronic device loads the executable codes corresponding to one or more process of the application programs into the memory 702, and the application programs stored in the memory 702 are executed by the processor 503 such that the following actions/operations may be implemented.

Obtaining a RAW image packet, wherein the RAW image packet includes at least two RAW images, and the at least two RAW images have different exposure durations.

Unpacking the RAW image packet and obtaining the at least two of RAW images.

Obtaining an HDR RAW image by performing an image synthesis operation on the at least two RAW images. That is, the HDR RAW image has an HDR.

Performing a previewing, photographing, or video-recording operation on the HDR RAW image.

Figure 13:
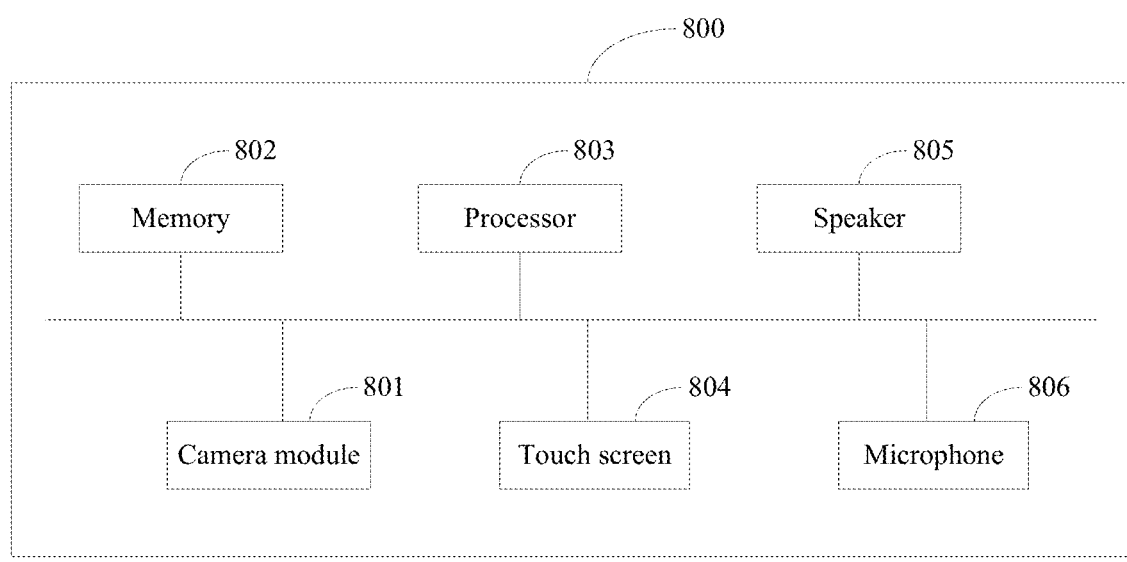
FIG. 13 is another structural diagram of an electronic device according to some embodiments.

As shown in FIG. 13, the electronic device 800 may include a camera module 801, a memory 802, a processor 803, a touch screen 804, a speaker 805, a microphone 806, and the like.

The camera module 801 may include an image processing circuit. The image processing circuit may be implemented by hardware and/or software components, and may include various processing units for defining image signal processing pipelines. The image processing circuit at least includes a camera, an image signal processor (ISP), a control logic, an image memory and a display. The camera at least includes one or more lenses and an image sensor. The image sensor may include a color filter array (such as a Bayer filter). The image sensor can acquire light intensity and wavelength information captured by each image pixel of the image sensor, and provide a set of original image data that can be processed by the image signal processor.

The image signal processor can process the original image data pixel by pixel in various formats. For example, each image pixel may have a bit depth of 8, 10, 12 or 14 bits, and the image signal processor may perform one or more image-processing operations on the original image data and collect statistical information of the image data. The image-processing operations can be performed according to the same or different bit depth accuracy. The original image data can be stored in the image memory after being processed by the image signal processor. The image signal processor may also receive image data from the image memory.

The image memory can be a part of a memory device, a storage device, or an independent dedicated memory in the electronic device, and can include direct memory access (DMA) features.

When the image data from the image memory is received, the image signal processor may perform one or more image-processing operations, such as time domain filtering. The processed image data can be sent to the image memory for further processing before being displayed. The image signal processor may also receive processing data from the image memory and perform image data processing in the original domain and in the RGB and YCbCr color spaces for the processing data. The processed image data can be output to the display for the users' viewing and/or further processing by the graphics engine or graphics processing unit (GPU). In addition, the output of the image signal processor can also be sent to the image memory, and the display can read the image data from the image memory. In some embodiments, the image memory may be configured to implement one or more frame buffers.

The statistical data determined by the image signal processor can be sent to the control logic. For example, the statistical data may include statistical information of the image sensor such as auto exposure, auto white balance, auto focus, flicker detection, black level compensation, lens shadow correction, etc.

The control logic may include a processor and/or microcontroller that executes one or more routines (e.g. firmware). One or more routines can determine control parameters of the camera and ISP based on the received statistical data. For example, the control parameters of the camera may include control parameters for camera flash, control parameters (such as focal length for focusing or zooming) for the lens, or a combination of these parameters. The control parameters for ISP may include gain levels, color correction matrices, and the like for automatic white balance and color adjustment (e.g. during RGB processing).

Figure 14:
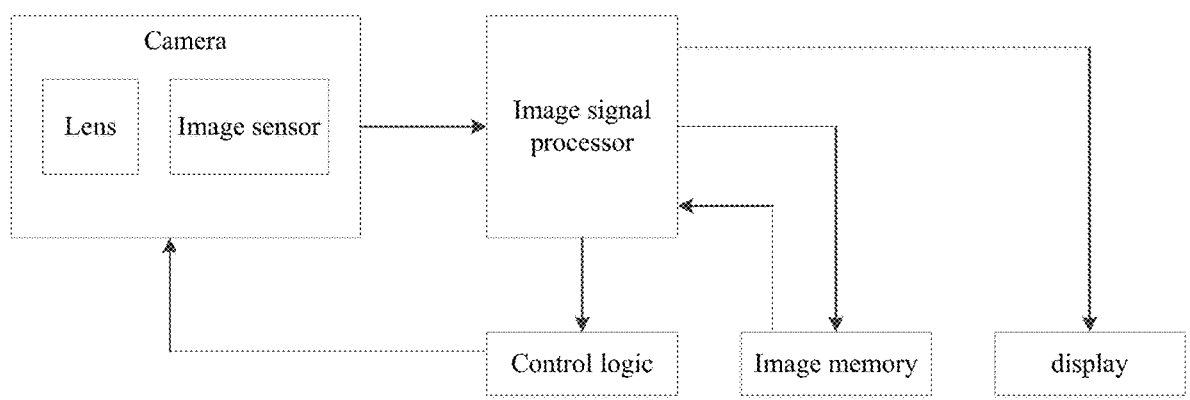
FIG. 14 is a structural diagram of an image-processing circuit according to some embodiments.

FIG. 14 is a structural diagram of an image-processing circuit according to this embodiment. As shown in FIG. 14, for ease of illustration, only various aspects of image processing techniques related to embodiments of the present disclosure are shown.

For example, the image-processing circuit may include a camera, an image signal processor, a control logic, an image memory, and a display. The camera may include one or more lenses and an image sensor. In some embodiments, the camera may be either a telephoto camera or a wide-angle camera.

A first image collected by the camera is transmitted to the image signal processor for processing. After processing the first image, the image signal processor can send the statistical data of the first image (such as the brightness of the image, the contrast value of the image, the color of the image, etc.) to the control logic. The control logic can determine control parameters of the camera according to the statistical data, so that the camera can perform an automatically-focus operation, an automatically-exposing operation and other operations according to the control parameters. The first image can be stored in the image memory after being processed by the image signal processor. The image signal processor may also read an image stored in the image memory for processing. In addition, the first image can be directly sent to the display for display after being processed by the image signal processor. The display can also read an image in the image memory for display.

In addition, if not shown in the figure, the electronic equipment can also include a CPU and a power supply module. The CPU is connected with the control logic, the image signal processor, the image memory, and the display. The CPU is used for global control. The power supply module is used to power each module.

The application programs stored in the memory 802 contains executable codes. The application programs may be formed as various functional modules. The processor 803 implements various function applications and data processing by executing the application programs stored in the memory 802.

The processor 803 is a control center of the electronic device, and is configured to be connected all parts of the electronic device via various interfaces and lines. Various functions and data processing of the electronic device may be implemented by running or executing the application programs stored in the memory 802 and calling data stored in the memory 802. Thus, the electronic device may be monitored wholly.

The touch screen 804 may be used to receive a touch control operation on electronic device by a user. The speaker 805 can play sound signals. The microphone 806 can be used to capture sound signals.

In this embodiment, the processor 803 in the electronic device loads the executable codes corresponding to one or more process of the application programs into the memory 802, and the application programs stored in the memory 802 are executed by the processor 803 such that the following actions/operations may be implemented.

Obtaining a RAW image packet, wherein the RAW image packet comprises at least two RAW images, and the at least two RAW images have different exposure durations;

Unpacking the RAW image packet and obtaining the at least two of RAW images;

Obtaining an HDR RAW image with a high dynamic range by performing an image synthesis operation on the at least two RAW images. The HDR RAW image has an HDR: and Performing a previewing, photographing, or video-recording operation on the HDR RAW image.

In some embodiments, the processor 803 performs obtaining a RAW image packet, wherein the RAW image packet comprises at least two RAW images, and the at least two RAW images have different exposure durations, meaning that obtaining the RAW image packet, wherein the RAW image packet comprises a first RAW image and a second RAW image that are sequentially exposed, and the first RAW image has an exposure duration longer than that of the second RAW image.

The processor 803 performs a depacketizing-processing for the RAW image packet and obtaining at least two of RAW images, meaning that performing the depacketizing-processing for the RAW image packet and obtaining the first RAW image and the second RAW image.

The processor 803 synthesizes the at least two RAW images and obtaining an HDR RAW image, meaning that performing the synthesizing-processing for the first RAW image and the second RAW image and obtaining the HDR RAW image.

In some embodiments, the processor 803 performs a previewing, photographing, or video-recording operation on the HDR RAW image, which means that converting the HDR RAW image into a YUV image; and preprocessing the YUV image and performing the previewing, photographing, or video-recording operation on the preprocessed YUV image.

In some embodiments, after the converting the HDR RAW image into a YUV image, the processor 803 further performs storing the YUV image converted from the HDR RAW image into a preset first image buffer queue; obtaining a plurality of YUV images from the first image buffer queue in response to receiving a photographing instruction; performing a denoising processing for the plurality of YUV images and obtaining a first denoised image; and responding to the photographing instruction according to the first denoised image.

In some embodiments, after the performing the depacketizing-processing for the RAW image packet and obtaining the first RAW image and the second RAW image, the processor 803 further performs storing the second RAW image into a preset second image buffer queue; obtaining a plurality of second RAW images from the second image buffer queue in response to receiving a photographing instruction, wherein the plurality of second RAW images are arranged in an order of times at which the plurality of second RAW images are stored into the second image buffer queue; obtaining a first synthesized image by performing an image synthesis operation on the plurality of second RAW images; and responding to the photographing instruction according to the first synthesized image.

In some embodiments, the processor 803 performs synthesizing the plurality of second RAW images and obtaining a first synthesized image, which means that performing a denoising processing for the plurality of second RAW images and obtaining a second denoised image; and boosting a brightness of the second denoised image and obtaining the first synthesized image.

In some embodiments, after the unpacking the RAW image packet and obtaining the first RAW image and the second RAW image, the processor 803 further performs storing the first RAW image and the second RAW image into a preset third image buffer queue; obtaining a plurality of first RAW images and one second RAW image from the third image buffer queue in response to receiving a photographing instruction, wherein the plurality of first RAW images are arranged in an order of times at which the plurality of first RAW images are stored into the second image buffer queue, and the one second RAW image corresponds to one first RAW image and is arranged at the backmost of the third image buffer queue; denoising the plurality of first RAW images and obtaining a third denoised image; performing the HDR-synthesizing-processing for the plurality of first RAW images and the one second RAW image and obtaining a second synthesized image; and responding to the photographing instruction according to the second synthesized image.

In the foregoing embodiments, the descriptions of the various embodiments are different, and the detailed descriptions for some embodiments may be referred from the detailed description of the above methods for image-processing, which are not described herein.

The apparatus for image-processing according to embodiments of the present disclosure belongs to the same concept as the method for image-processing in the above embodiments, and any method, whose implementation processes are described in the methods for image-processing in the above embodiments, may be run on the apparatus for image-processing, which will not described herein again.

It should be noted that, for the method of the proximity detection in the embodiments of the present disclosure, those skilled in the art can understand that all or part of a process of implementing the proximity-detection method in the embodiments of the present disclosure is implemented through controlling related hardware by computer programs. The computer programs can be stored in a computer readable storage medium, such as a memory, and executed by at least one processor. The computer programs can include an implementation of the proximity-detection method as described during the execution. The storage medium may be a magnetic disk, an optical disk, a read only memory (ROM), a random access memory (RAM), or the like.

For the apparatus for image-processing of embodiments of the present disclosure, each functional module may be integrated into one processing chip, or each module may exist physically separately, or two or more modules may be integrated into one module. The above integrated modules can be implemented in the form of hardware or in the form of software functional modules. The integrated module, if implemented in the form of a software functional module and sold or used as a standalone product, may also be stored in a computer readable storage medium, such as a read only memory, a magnetic disk or an optical disk, etc.

The method for image-processing and the electronic device in embodiments of the present disclosure are described in detail. The principles and implementations of the present disclosure are described with examples. The description of the above embodiments is only used to help understand a method and a core idea of the present disclosure. Meanwhile, for those skilled in the art, there will be changes in specific embodiments and disclosure scopes according to the idea of the present disclosure. The descriptions should not be construed to limit the present disclosure.

What is claimed is:

1. A method for image-processing, comprising:
    obtaining a RAW image packet comprising of at least two RAW images, wherein the at least two RAW images are generated during one frame of image and comprise a first RAW image and a second RAW image having different exposure durations;
    unpacking the RAW image packet and obtaining the first RAW image and the second RAW image;
    storing the first RAW image and the second RAW image into a preset third image buffer queue;
    obtaining a plurality of first RAW images from a second image buffer queue and only one second RAW image from the third image buffer queue in response to receiving a photographing instruction, wherein the plurality of first RAW images are arranged in an order of times at which the plurality of first RAW images are stored into the second image buffer queue, and the one second RAW image corresponds to one first RAW image and is arranged at the backmost of the third image buffer queue;
    denoising the plurality of first RAW images and obtaining a third denoised image, comprising:
        determining a basic frame from the RAW images;
        aligning the RAW images;
        calculating an average pixel value of each pixel point based on the aligned images;
        changing the pixel value of the pixel point in the RAW image that is the basic frame to the average pixel value; and
        obtaining the third denoised image;
    obtaining a second synthesized image by performing an image synthesis operation on the plurality of first RAW images and the one second RAW image;
    responding to the photographing instruction according to the second synthesized image;
    obtaining a High Dynamic Range (HDR) RAW image by performing an image synthesis operation on the at least two RAW images; and
    performing a previewing, photographing, or video-recording operation on the HDR RAW image.

2. The method of claim 1, wherein the first RAW image and the second RAW image are sequentially exposed, and the first RAW image has an exposure duration longer than that of the second RAW image; and
    the HDR RAW image is obtained from synthesizing the first RAW image and the second RAW image.

3. The method of claim 2, further comprising:
    after the unpacking the RAW image packet and obtaining the first RAW image and the second RAW image, storing the second RAW image into a preset second image buffer queue;
    obtaining a plurality of second RAW images from the second image buffer queue in response to receiving a photographing instruction, wherein the plurality of second RAW images are arranged in an order of times at which the plurality of second RA images are stored into the second image buffer queue;
    obtaining a first synthesized image by performing an image synthesis operation on the plurality of second RAW images; and
    responding to the photographing instruction according to the first synthesized image.

4. The method of claim 3, wherein obtaining the first synthesized image by performing the image synthesis operation on the plurality of second RAW images comprises:
    denoising the plurality of second RAW images and obtaining a second denoised image, comprising:
        determining one of the plurality of second RAW images as a basic frame;
        aligning the plurality of second RAW images;
        calculating an average pixel value of each pixel point based on the aligned second RAW images; and
        changing a pixel value of each pixel point in the basic frame to a corresponding average pixel value to obtain the second denoised image; and
    boosting a brightness of the second denoised image and obtaining the first synthesized image.

5. The method of claim 1, wherein performing the previewing, photographing, or video-recording operation on the HDR RAW image comprises:
    converting the HDR RAW image into a YUV image; and
    preprocessing the YUV image and performing the previewing, photographing, or video-recording operation on the preprocessed YUV image.

6. The method of claim 5, further comprising:
    after the converting the HDR RAW image into the YUV image, storing the YUV age converted from the HDR RAW image into a preset first image buffer queue;
    obtaining a plurality of YUV images from the first image buffer queue in response to receiving a photographing instruction;
    denoising the plurality of YUV images and obtaining a first denoised image, comprising:
        determining one of the plurality of YUV images as a basic frame;
        aligning the plurality of YUV images;
        calculating an average pixel value of each pixel point aligned on the images; and
        changing a pixel value of each pixel point in the basic frame to a corresponding average pixel value to obtain the first denoised image; and responding to the photographing instruction according to the first denoised image.

7. An electronic device comprising a non-transitory memory storing executable codes, and a processor, wherein upon loading the executable codes, the processor is configured for:
obtaining a RAW image packet comprising of at least two RAW images, wherein the at least two RAW images are generated during one frame of image and comprise a first RAW image and a second RAW image having different exposure durations;
unpacking the RAW image packet and obtaining the first RAW image and the second RAW image;
storing the first RAW image and the second RAW image into a preset third image buffer queue;
obtaining a plurality of first RAW images from a second image buffer queue and only one second RAW image from the third image buffer queue in response to receiving a photographing instruction, wherein the plurality of first RAW images are arranged in an order of times at which the plurality of first RAW images are stored into the second image buffer queue, and the one second RAW image corresponds to one first RAW image and is arranged at the backmost of the third image buffer queue;
denoising the plurality of first RAW images and obtaining a third denoised image, comprising:
determining a basic frame from the RAW images;
aligning the RAW images;
calculating an average pixel value of each pixel point based on the aligned images;
changing the pixel value of the pixel point in the RAW image that is the basic frame to the average pixel value;
obtaining the third denoised image;
obtaining a second synthesized image by performing an image synthesis operation on the plurality of first RAW images and the one second RAW image;
responding to the photographing instruction according to the second synthesized image;
obtaining a High Dynamic Range (HDR) RAW image by performing an image synthesis operation on the at least two RAW images; and
performing a previewing, photographing, or video-recording operation on the HDR RAW image.

8. The electronic device of claim 7, wherein the first RAW image and the second RAW image are sequentially exposed, and the first RAW image has an exposure duration longer than that of the second RAW image; and
the HDR RAW image is obtained from synthesizing the first RAW image and the second RAW mage.

9. The electronic device of claim 8, wherein the processor is further configured for:
storing the second RAW image into a preset second image buffer queue, after the unpacking the RAW image packet and obtaining the first RAW image and the second RAW image;
obtaining a plurality of second RAW images from the second image buffer queue in response to receiving the photographing instruction, wherein the plurality of second RAW images are arranged in an order of times at which the plurality of second RAW images are stored into the second image buffer queue;
obtaining a first synthesized image by performing an image synthesis operation on the plurality of second RAW images; and
responding to the photographing instruction according to the first synthesized image.

10. The electronic device of claim 9, wherein obtaining the first synthesized image by performing the image synthesis operation on the plurality of second RAW images comprises:
denoising the plurality of second RAW images and obtaining a second denoised image, comprising:
determining one of the plurality of second RAW images as a basic frame;
aligning the plurality of second RAW images;
calculating an average pixel value of each pixel point based on the aligned second RAW images; and
changing a pixel value of each pixel point in the basic frame to a corresponding average pixel value to obtain the second denoised image; and
boosting a brightness of the second denoised image and obtaining the first synthesized image.

11. The electronic device of claim 9, wherein the processor is further configured for:
storing the first RAW image and the second RAW image into a preset third image buffer queue, after the unpacking the RAW image packet and obtaining the first RAW image and the second RAW image.

12. The electronic device of claim 7, wherein performing the previewing, photographing, or video-recording operation on the HDR RAW image comprises:
converting the HDR RAW image into a YUV image; and
preprocessing the YUV image and performing the previewing, photographing, or video-recording operation for the preprocessed YUV image.

13. The electronic device of claim 12, wherein the processor is further configured for:
storing the YUV image converted from the HDR RAW image into a preset first image buffer queue, after the converting the HDR RAW image into a YUV image;
obtaining a plurality of YUV images from the first image buffer queue in response to receiving the photographing instruction;
denoising the plurality of YUV images and obtaining a first denoised image, comprising:
determining one of the plurality of YUV images as a basic frame;
aligning the plurality of YUV images;
calculating an average pixel value of each pixel point based on the aligned YUV images; and
changing a pixel value of each pixel point in the basic frame to a corresponding average pixel value to obtain the first denoised image; and
responding to the photographing instruction according to the first denoised image.

14. A non-transitory storage medium storing a plurality of instructions, which when executed, cause a processor to perform a method for image-processing, wherein the method comprises:
obtaining a RAW image packet comprising of at least two RAW images, wherein the at least two RAW images are generated during one frame of image and comprise a first RAW image and a second RAW image having different exposure durations;
unpacking the RAW image packet and obtaining the first RAW image and the second RAW image;
storing the first RAW image and the second RAW image into a preset third image buffer queue;
obtaining a plurality of first RAW images from a second image buffer queue and only one second RAW image from the third image buffer queue in response to receiving a photographing instruction, wherein the plurality of first RAW images are arranged in an order of times at which the plurality of first RAW images are stored into the second image buffer queue, and the one second RAW image corresponds to one first RAW image and is arranged at the backmost of the third image buffer queue;

denoising the plurality of first RAW images and obtaining a third denoised image, comprising:
 determining a basic frame from the RAW images;
 aligning the RAW images;
 calculating an average pixel value of each pixel point based on the aligned images;
 changing the pixel value of the pixel point in the RAW image that is the basic frame to the average pixel value; and
 obtaining a third denoised image;

obtaining a second synthesized image by performing an image synthesis operation on the plurality of first RAW images and the one second RAW image;

responding to the photographing instruction according to the second synthesized image;

obtaining a High Dynamic Range (HDR) RAW image by performing an image synthesis operation on the at least two RAW images; and performing a previewing, photographing, or video-recording operation on the HDR RAW image.

15. The non-transitory storage medium of claim 14, wherein the first RAW image and the second RAW image are sequentially exposed, and the first RAW image has an exposure duration longer than that of the second RAW image; and
 the HDR RAW image is obtained from synthesizing the first RAW image and the second RAW image.

16. The non-transitory storage medium of claim 15, wherein a preset second image buffer queue comprises one or more second RAW images each of which is unpacked from one RAW image packet;
 wherein the method further comprises:
 obtaining a plurality of second RAW images from the second image buffer queue in response to receiving a photographing instruction, wherein the plurality of second RAW images are arranged in an order of times at which the plurality of second RAW images are stored into the second image buffer queue;
 obtaining a first synthesized image by performing an image synthesis operation on the plurality of second RAW images; and
 responding to the photographing instruction according to the first synthesized image.

17. The non-transitory storage medium of claim 16, wherein obtaining the first synthesized image by performing the image synthesis operation on the plurality of second RAW images comprises:
 denoising the plurality of second RAW images and obtaining a second denoised image; and
 boosting a brightness of the second denoised it age and obtaining the first synthesized image.

18. The non-transitory storage medium of claim 16, wherein a preset third image buffer queue comprises one or more first RAW images each of which is unpacked from one RAW image packet and one or more second RAW images each of which is unpacked from one RAW image packet.

19. The non-transitory storage medium of claim 14, wherein a preset first image buffer queue stores one or more YUV images each of which is converted from one HDR RAW image;
 wherein the method further comprises:
 obtaining a plurality of YUV images from the first image buffer queue in response to receiving a photographing instruction;
 denoising the plurality of YUV images and obtaining a first denoised image, comprising:
 determining one of the plurality of YUV images as a basic frame;
 aligning the plurality of YUV images;
 calculating an average pixel value of each pixel point based on the aligned YUV images; and
 changing a pixel value of each pixel point the basic frame to a corresponding average pixel value to obtain the first denoised image; and
 responding to the photographing instruction according to the first denoised image.

* * * * *